United States Patent
Yoshida

[11] Patent Number: 5,918,080
[45] Date of Patent: Jun. 29, 1999

[54] CAMERA AND METHOD OF DISCERNING STATUS OF A PHOTO FILM CASSETTE

[75] Inventor: Yutaka Yoshida, Saitama, Japan

[73] Assignee: Fuji Photo Film Co., Ltd., Kanagawa, Japan

[21] Appl. No.: 08/896,949

[22] Filed: Jul. 18, 1997

[30] Foreign Application Priority Data

Jul. 22, 1996 [JP] Japan .................................. 8-192490

[51] Int. Cl.⁶ .................................................. G03B 7/24
[52] U.S. Cl. .......................... 396/207; 396/408; 396/515; 396/538
[58] Field of Search .................................. 396/207, 515, 396/538, 408, 387

[56] References Cited

U.S. PATENT DOCUMENTS

| | | | |
|---|---|---|---|
| 5,541,681 | 7/1996 | Cocca et al. | 396/207 |
| 5,666,572 | 9/1997 | Tsuji et al. | 396/207 |
| 5,687,414 | 11/1997 | Haraguchi et al. | 396/207 |
| 5,734,939 | 3/1998 | Yamazaki et al. | 396/207 |

*Primary Examiner*—Eddie C. Lee
*Attorney, Agent, or Firm*—Sughrue, Mion, Zinn Macpeak & Seas, PLLC

[57] ABSTRACT

A photo film cassette contains a photo film, which is exited from a cassette shell when a spool is rotated in an unwinding direction. A data disk is integrally rotatable with the spool. The spool, if the photo film is unexposed, is stopped in an unexposed position with the bar code portion located in a first opening and with the quiet zone located in a second opening. The spool, if the photo film is partially exposed, all exposed or developed, is stopped in one of other predetermined positions. In a camera at first, a spool drive shaft is set in a reference position. To discern a used status of the cassette, after the camera is loaded with the cassette, the spool drive shaft is rotated in reverse to the unwinding. The spool drive shaft is engaged with the spool being in the initial position, to rotate the spool further. While the spool is rotated, the black and white bars and the quiet zone are detected with two photo sensors respectively through the first and second openings. As per a signal from the first photo sensor, it is determined whether the used status of the cassette is an unexposed status of the photo film. If the used status of the cassette is determined different from the unexposed status, then either one is determined between a partially exposed status and an exposed or developed status of the photo film as per a signal from the second photo sensor.

23 Claims, 16 Drawing Sheets

F I G. 7A
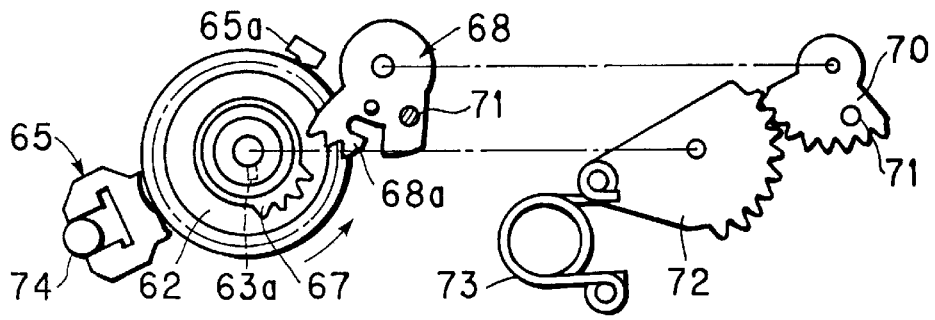
F I G. 7B
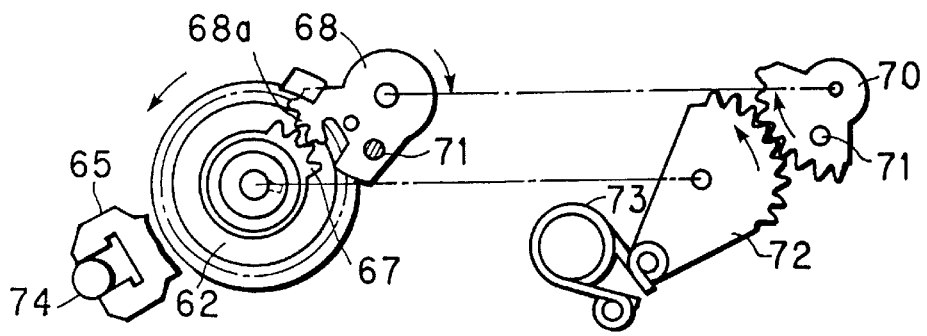
F I G. 7C
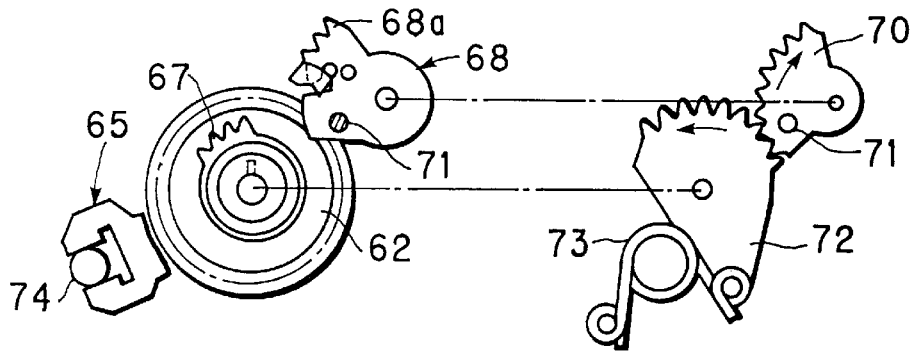
F I G. 7D
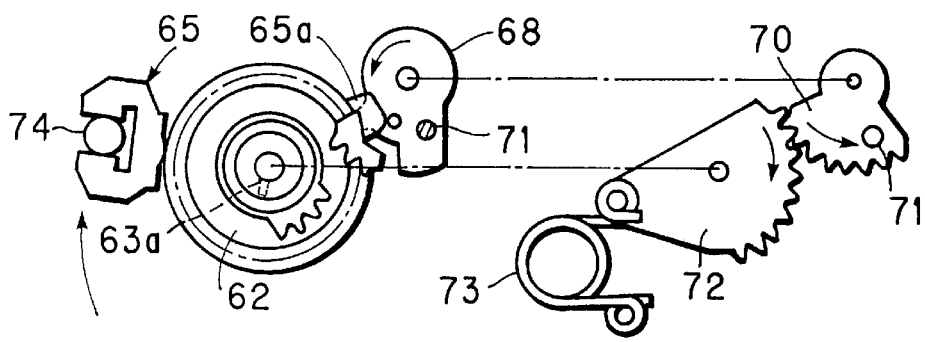

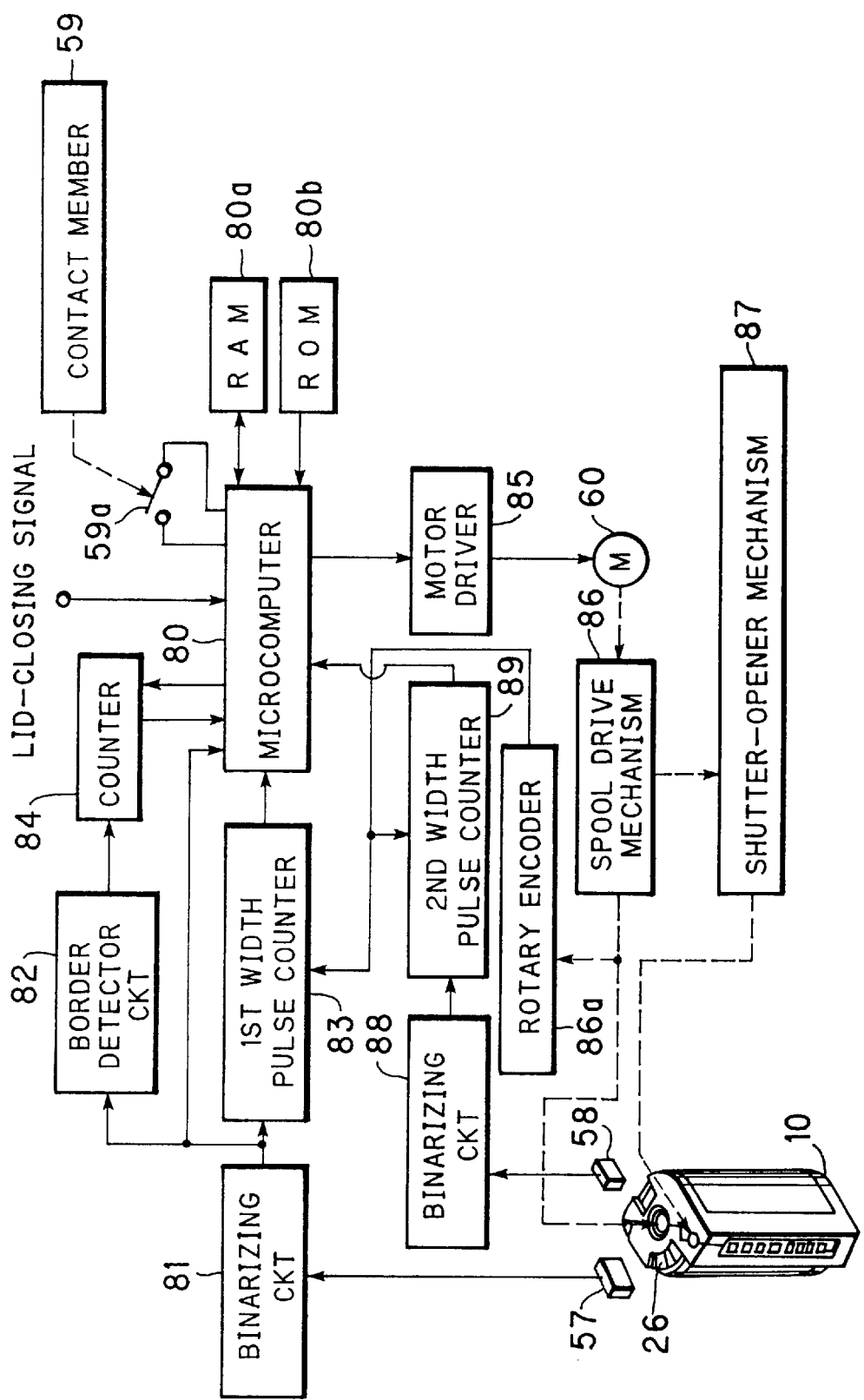

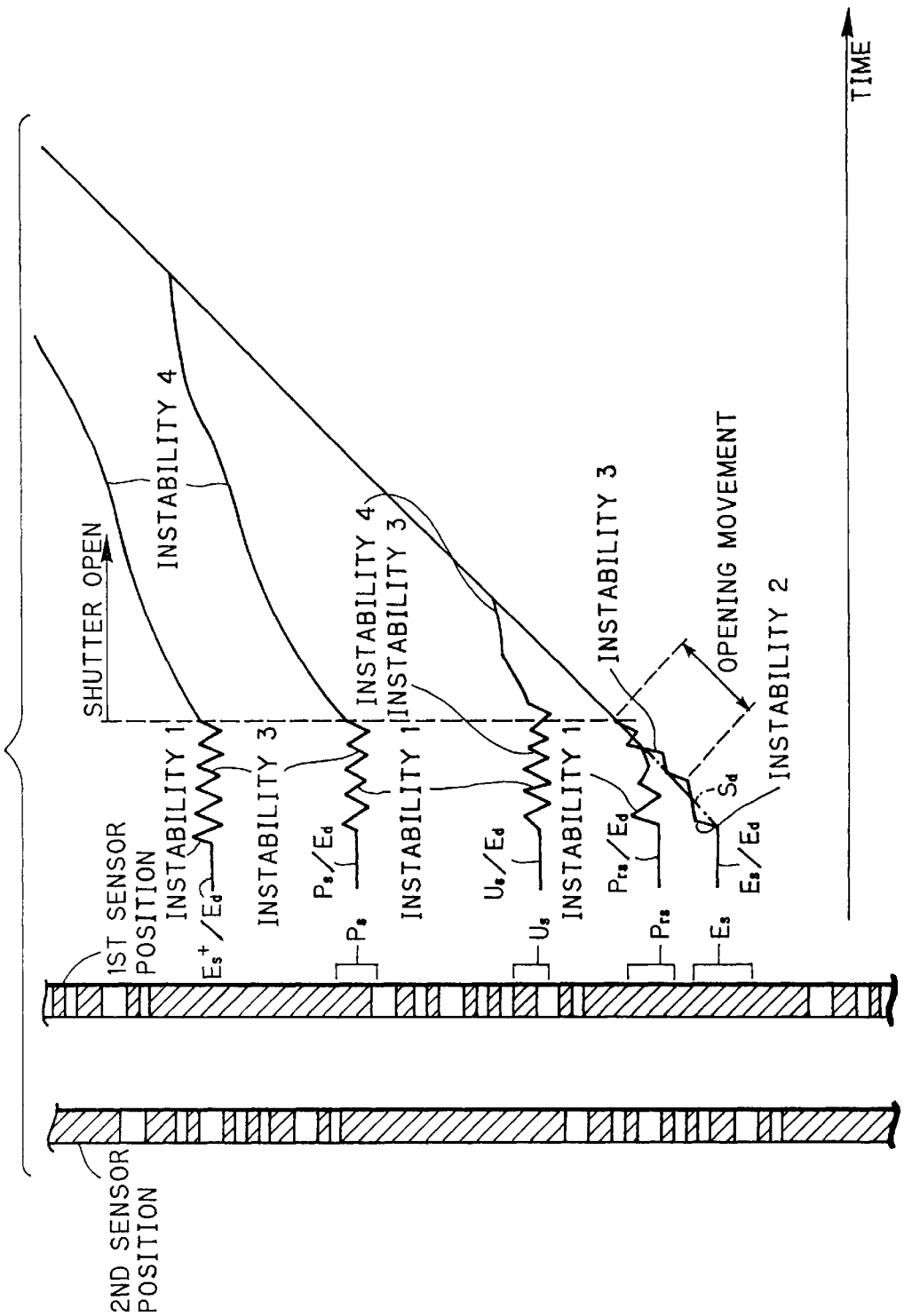

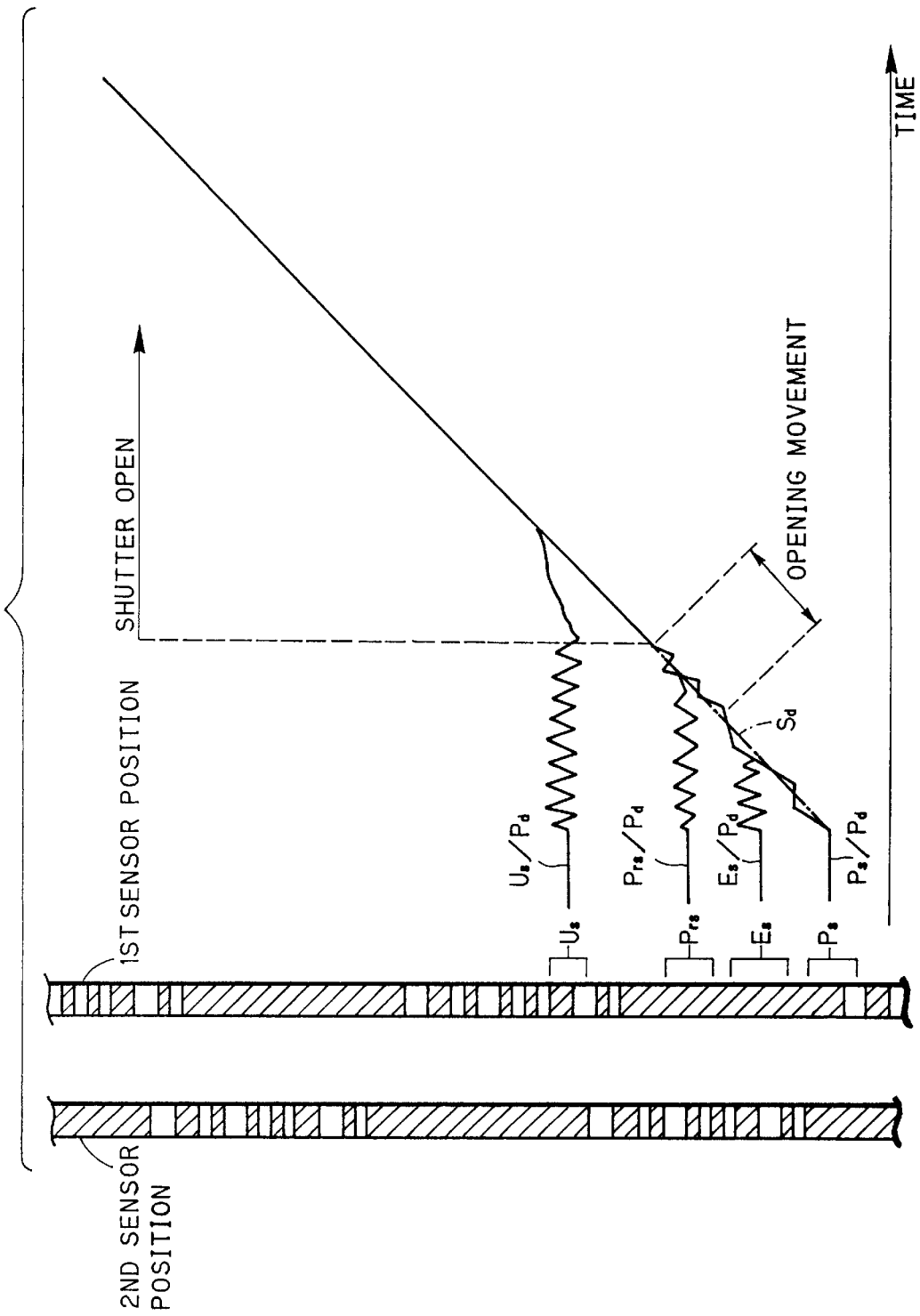

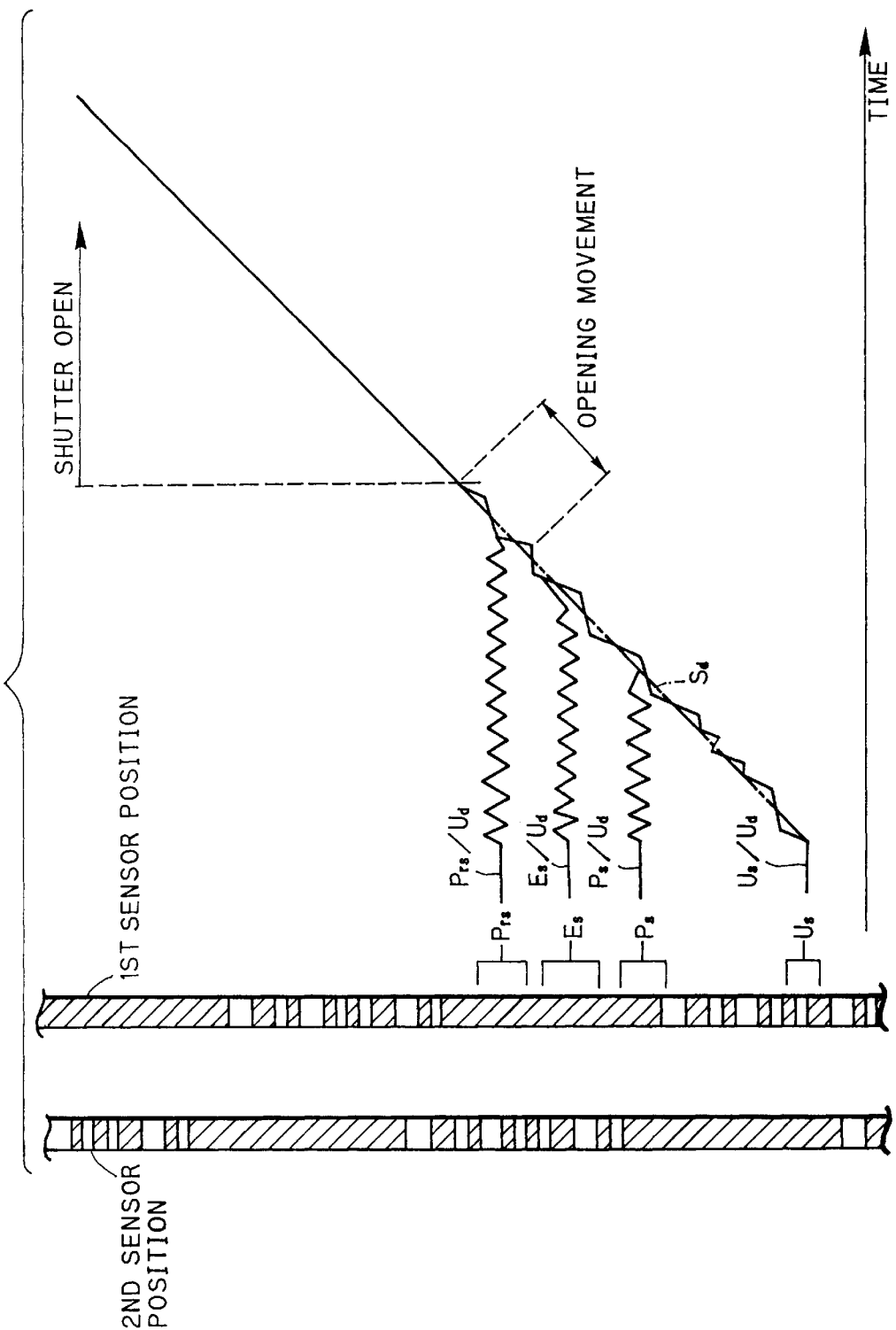

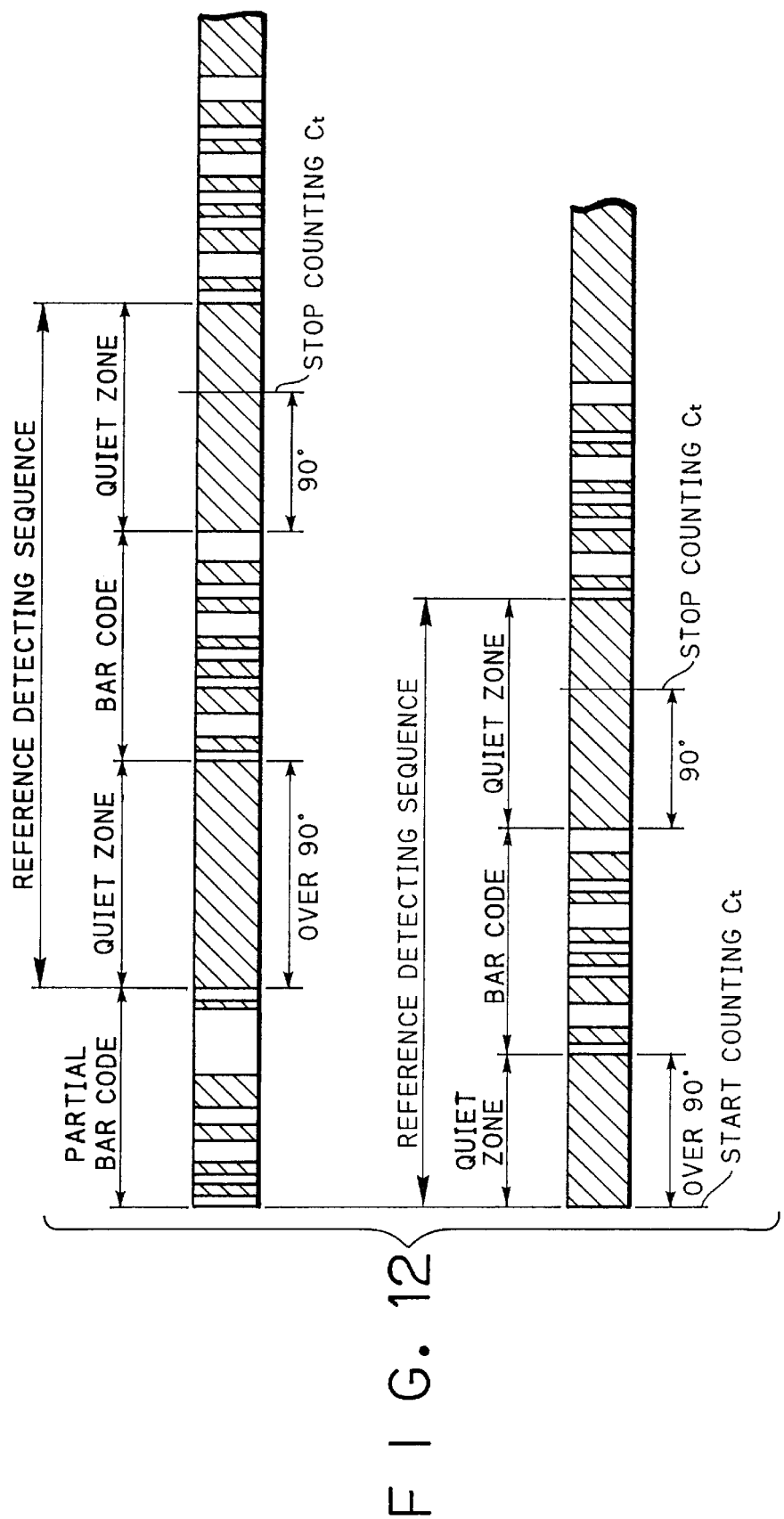
F I G. 12

CAMERA AND METHOD OF DISCERNING STATUS OF A PHOTO FILM CASSETTE

BACKGROUND OF THE INVENTION

1. Field of the Invention

The present invention relates to a camera, and a method of discerning status of a photo film cassette. More particularly, the present invention relates to a camera in which one of used statuses of photo film contained in a photo film cassette can be discerned reliably according to a position of a data disk in the photo film cassette, and a method of discerning one of used statuses of the photo film contained in the photo film cassette.

2. Description Related to the Prior Art

There is a known photo film cassette of a type IX240, for example FUJICOLOR NEXIA manufactured by Fuji Photo Film Co., Ltd. This type IX240 is characterized in that rotation of a spool causes photo film to advance to an outside of a shell of the cassette through a photo film passage port. In the photo film cassette, the photo film passage port contains a cassette shutter member which is rotatable to open and close the photo film passage port, and when the passage port is closed, operates for blocking ambient light, instead of light-trapping fabric which is conventional in the field of photo film cassettes. The photo film cassette also has a data disk, on which a rotary bar code is printed. Various kinds of information, including photo film speed and the number of available frames, are represented by the rotary bar code.

The data disk is rotatable with the spool. The rotary bar code is constituted by a bar code portion and a quiet zone. The bar code portion consists of a combination of plural black bars and plural white bars alternately arranged. The black bars have low reflectance, and have black or other dark color. The white bars have high reflectance, and have white, silver or other light color. The quiet zone has a sufficiently great central angle with the low reflectance, and operates to define beginning and closing ends of the bar code portion. Immediately after insertion of the photo film cassette into a camera, the spool is rotated. During the rotation, the rotary bar code is read by a photo sensor of the camera through a first opening for reading data or a second opening for discernment of used statuses.

In the photo film cassette, it is impossible to discern any of unexposed, partially exposed, all exposed and developed statuses of the photo film only with appearance of the photo film cassette, because all the photo film is contained in the cassette shell. There is a known construction in which the camera has the photo sensor to read the rotary bar code for discerning one of the used statuses for the purpose of avoiding an exposure-taking operation with the photo film cassette having the exposed or developed status. A portion of the rotary bar code to appear in the second opening is predetermined according to each of the used statuses.

The photo film cassette is unloaded from the camera after finishing rewinding the photo film. If the photo film cassette contains the photo film being exposed, the spool is controlled to stop for the quiet zone to exist in the second opening. If the photo film cassette contains the photo film being unexposed, the spool is oriented for the bar code portion to exist in the second opening. To avoid accidental deviation of the position of the spool, a spool lock mechanism operates for blocking rotation of the spool while the cassette shutter member closes the photo film passage port.

In the camera, a spool drive shaft is engaged with the spool to rotate it. An opener drive shaft is engaged with the cassette shutter member to rotate it from the closed position to the open position. To reduce a size or the number of parts of the camera, a single motor is used in the camera for rotating both the spool drive shaft and the opener drive shaft. Partial rotation of the spool drive shaft is transmitted to the opener drive shaft. In the camera, the spool is rotated in an rewinding direction of the photo film for the purpose of reading the rotary bar code or detect a position of the rotary bar code upon the cassette insertion. The opener drive shaft is also rotated in the course of the rotation of the spool.

The spool drive shaft has an engaging projection, which is engageable with an axial key way formed in the spool. It is likely that a rotational position of the engaging projection is different from a rotational position of the key way of the spool, due to a difference between the status of a previously unloaded cassette and the status of the photo film cassette presently loaded. Thus the spool drive shaft has a construction slidable in an axial direction of the spool. Before its rotational position meets that of the key way, the spool drive shaft is pushed upwards from the spool against bias of a spring associated with the spool drive shaft. Upon meeting the position of the key way, the spool drive shaft becomes engaged with the key way.

To discriminate the used statuses of the photo film cassette, the number of borders each of which is defined between one of the white bars and one of the quiet zone and the black bars is counted after a start of rotating the spool drive shaft. According to the counted border number, it is determined which of the quiet zone and the bar code portion existed in the first or second opening at the time of cassette insertion. As a result the used status of the photo film in the photo film cassette is discerned.

There is a problem in that the used statuses are misread in the camera of which the motor is used for rotating both the cassette shutter member and the spool. There are various causes of this misreading. Firstly at the time of the cassette insertion, the spool drive shaft is not oriented for meeting a position of the spool. Secondly a lock gear of the above-mentioned spool lock mechanism is rotated forcibly in spite of existence of a protruding portion of the lock lever of the spool lock mechanism within the path of the lock gear. Thirdly the spool drive shaft rotates the opener drive shaft before opening the cassette shutter member. Those phenomena create failure in reading by use of the photo sensor, as the data disk with the spool makes abnormally instable motion, for example abrupt reciprocal rotations in a small range or a provisional stop.

SUMMARY OF THE INVENTION

In view of the foregoing problems, an object of the present invention is to provide a camera in which one of used statuses of photo film contained in a photo film cassette can be discerned reliably irrespective of abnormally instable motion of a data disk, and a method of discerning one of used statuses of the photo film contained in the photo film cassette in a reliable manner.

In order to achieve the above and other objects and advantages of this invention, a photo film cassette includes a data disk, having a dark color, and secured to the spool in an integrally rotatable manner therewith. A rotary bar code portion is arranged on the data disk, including black bars with low reflectance and white bars with high reflectance arranged radially in an alternate manner. A quiet zone is located with an arc-shaped cut in a periphery of the data disk, and between beginning and closing ends of the bar code portion. A spool drive shaft of a camera is set in a reference position. After the camera is loaded with the cassette, the spool drive shaft is rotated from the reference position, the spool drive shaft, upon or after a start of rotation thereof, being engaged with the spool being in an initial position, to rotate the spool further from the initial position. While the spool is rotated, the bar code portion and the quiet zone are photoelectrically detected with first and second photo sensors respectively through the first and second openings. The initial position is determined in accordance with signals from the first and second photo sensors, the used status being discerned with the initial position.

In a preferred embodiment, first and second openings are formed in the cassette shell, for causing the data disk to appear. The spool is set according to the used status in an initial position selected from an unexposed position, a partially exposed position, an exposed position and a developed position which are arranged rotationally in a rewinding direction reverse to the unwinding direction, the spool being set in the unexposed position with the bar code portion located in the first opening and with the quiet zone located in the second opening, the spool being set in the partially exposed position with the quiet zone located in the first and second openings, the spool being set in the exposed position with the quiet zone located in the first opening and with the bar code portion located in the second opening. In the discerning method, after a camera is loaded with the cassette, a spool drive shaft is rotated from a reference position, the spool drive shaft, upon or after a start of rotation thereof, being engaged with the spool being in the initial position, to rotate the spool further from the initial position in the rewinding direction. While the spool is rotated, the black bars, the white bars, and the quiet zone are photoelectrically detected with first and second photo sensors respectively through the first and second openings. First determination is effected according to a signal from the first photo sensor, to determine whether the used status of the cassette is an unexposed status of the photo film. Second determination is effected according to a signal from the second photo sensor, to determine either one of a partially exposed status and an exposed or developed status of the photo film for the used status if the used status of the cassette is determined different from the unexposed status.

The first and second photo sensors output the signal at a first level while detecting the black bars and the quiet zone, and output the signal at a second level while detecting the white bars.

The reference position is defined an engaging position where the spool drive shaft is engaged with the spool while the initial position of the spool of the cassette is the exposed position in the loading chamber, or defined a position deviated from the engaging position in the unwinding direction.

Reverse rotation of the spool drive shaft is started when the cassette is inserted in the loading chamber, and finished after the quiet zone, the bar code portion, and again the quiet zone are detected at the first photo sensor.

The first determination includes counting a border number of the borders between the white bars and the black bars or the quiet zone in accordance with the signal from the first photo sensor. The first determination further includes comparing a reference border number with the counted border number, and if the counted border number is equal to or more than the reference border number, the used status being determined the unexposed status, and if the counted border number is less than the reference border number, the used status being determined the partially exposed or developed status.

Furthermore, a pulse is generated in synchronism with rotation of the spool drive shaft by a unit rotational angle. The pulse is counted while a level of the signal from the first photo sensor is constant, to obtain a first pulse number. It is detected which of the black bars, the white bars and the quiet zone is confronted with the first photo sensor according to the first pulse number.

Also, when the first pulse number comes up to a reference pulse number, it is detected that the quiet zone is confronted with the first photo sensor according to the first pulse number, wherein one angle is defined by multiplying the reference pulse number by the unit rotational angle, and is smaller than the central angle of the quiet zone and greater than the central angle of the black bars and the white bars.

BRIEF DESCRIPTION OF THE DRAWINGS

The above objects and advantages of the present invention will become more apparent from the following detailed description when read in connection with the accompanying drawings, in which:

FIG. 7A is an explanatory view in plan, illustrating the mechanism including the spool drive shaft in a state before starting rotation;

FIG. 7B is an explanatory view in plan, illustrating the mechanism including the spool drive shaft in a state where a cassette shutter is becoming open;

FIG. 7C is an explanatory view in plan, illustrating the mechanism including the spool drive shaft in a state after the cassette shutter becomes open;

FIG. 7D is an explanatory view in plan, illustrating the mechanism including the spool drive shaft in a state after the cassette shutter becomes closed in a cassette removing operation;

FIG. 8 is a block diagram schematically illustrating relevant circuits of the camera;

FIG. 9 is a graph illustrating relative positions of photo sensors, the bar code, and the spool in a state where the spool drive shaft initially lies in the exposed position;

FIG. 10 is a graph illustrating relative positions of photo sensors, the bar code, and the spool in a state where the spool drive shaft initially lies in the partially exposed position;

FIG. 11 is a graph illustrating relative positions of photo sensors, the bar code, and the spool in a state where the spool drive shaft initially lies in the unexposed position;

FIG. 12 is a timing chart illustrating relative positions of the bar code in the reference detecting sequence;

DETAILED DESCRIPTION OF THE PREFERRED EMBODIMENTS OF THE PRESENT INVENTION

Figure 1:
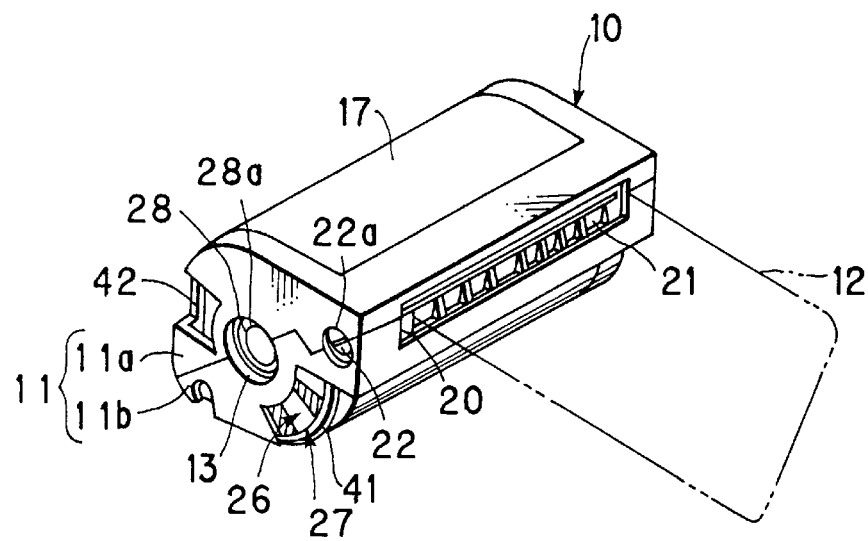
FIG. 1 is a perspective illustrating a photo film cassette having a data disk.
Figure 2:
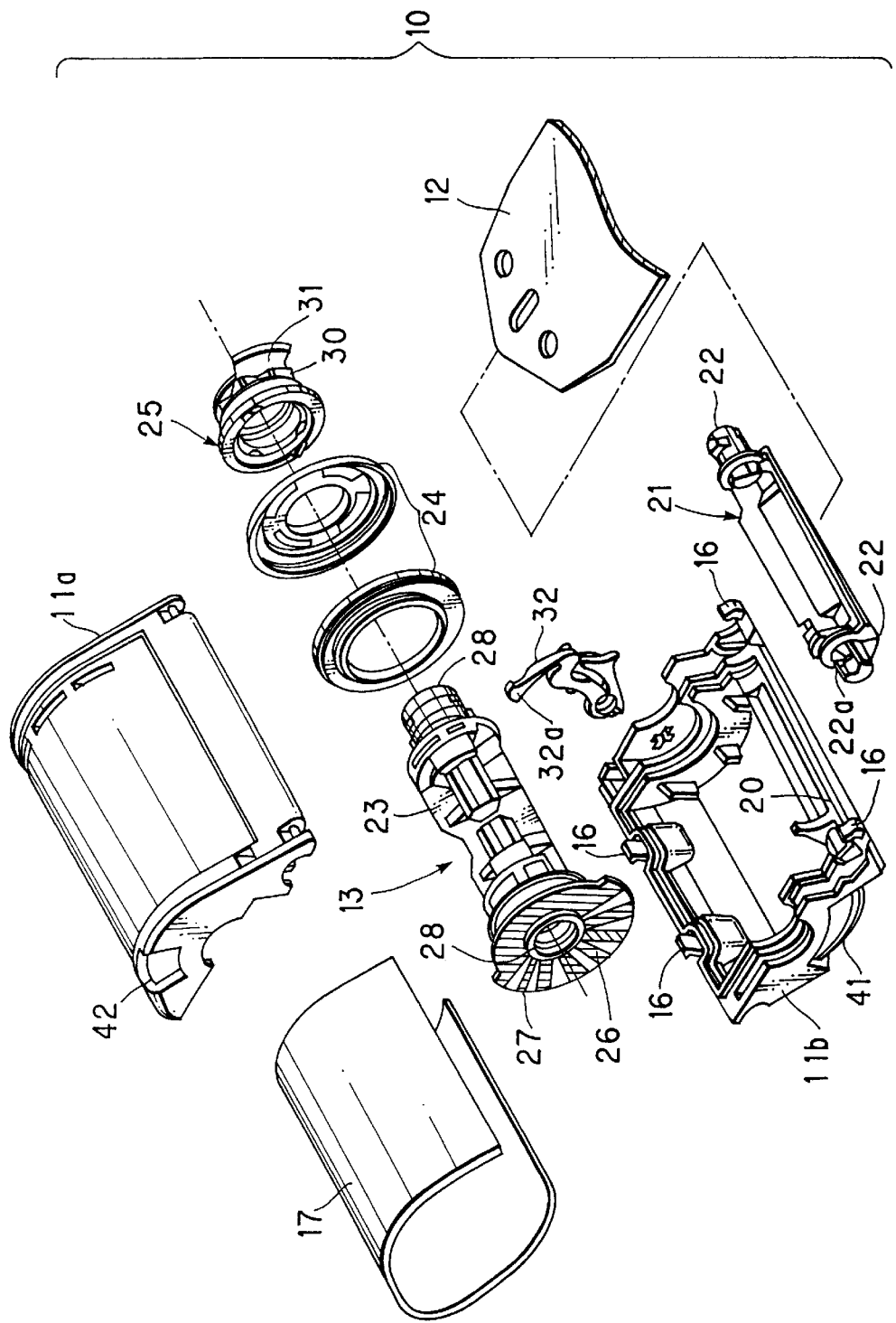
FIG. 2 is an exploded perspective illustrating the photo film cassette.

In FIGS. 1 and 2, a photo film cassette 10 consists of a cassette shell 11 containing a spool 13 about which photo film 12 is wound in a roll form. The cassette shell 11 has such a construction that, when the spool 13 is rotated in a direction to unwind the photo film 12, a leader of the photo film 12 is advanced to the outside of the cassette shell 11. When the spool 13 is rotated in a rewinding direction, the photo film 12 is wound into the cassette shell 11.

The cassette shell 11 is constituted by plastic shell halves 11a and 11b, which are joined together by use of engagement of retaining hooks 16 formed with the shell half 11b. A sticker 17 is attached about the cassette shell 11. A photo film passage port 20 is formed between respective tongues of the shell halves 11a and 11b for advancement and passage of the photo film 12. A cassette shutter 21 being rotatable is disposed for preventing entry of ambient light into the cassette shell 11. Two axial ends of the cassette shutter 21 respectively have an engaging hole 22, with which a key way 22a is formed. When a camera is loaded with the photo film cassette 10, an opener drive shaft (See FIG. 5) inside the camera is engaged with the engaging hole 22. The opener drive shaft is rotated to shift rotationally the cassette shutter 21 between closed and open positions. The cassette shutter 21, when in the closed position, blocks the photo film passage port 20, and when in the open position, leaves the photo film passage port 20 open.

The spool 13 includes a spool core 23, a pair of flanges 24, and a barrel 25. On the spool 13, a data disk 27 is formed integrally therewith. Each of axial ends of the spool core 23 has an engaging hole 28, in which a key way 28a is formed. When a camera is loaded with the cassette, a spool drive shaft in the camera is engaged with the spool core 23, and rotates the spool core 23 in the unwinding or rewinding direction.

The barrel 25 has a gear 30 and an indicator plate 31 both formed integrally therewith, and is rotatable integrally with the spool core 23. A combination of the gear 30 of the barrel 25 and a lock lever 32 constitutes a spool locking mechanism. The lock lever 32 is swingable inside the cassette shell 11 between locking and releasing positions. A protruding end 32a of the lock lever 32, when in the locking position, is engaged with the gear 30, and when in the releasing position, is disengaged from the gear 30. The spool core 23 is driven by the cassette shutter 21, and when the cassette shutter 21 is in the closed position, is swung to the locking position to stop the spool 13 from rotating by keeping it in a locked state. So the indicator plate 31 and the data disk 27 are rotationally stopped without accidental deviation from one of status positions which are respectively associated with a plurality of used status of the photo film 12. The spool core 23, when the cassette shutter 21 is in the open position, is swung to the releasing position to allow the spool 13 to rotate in an unlocked state.

Figure 3:
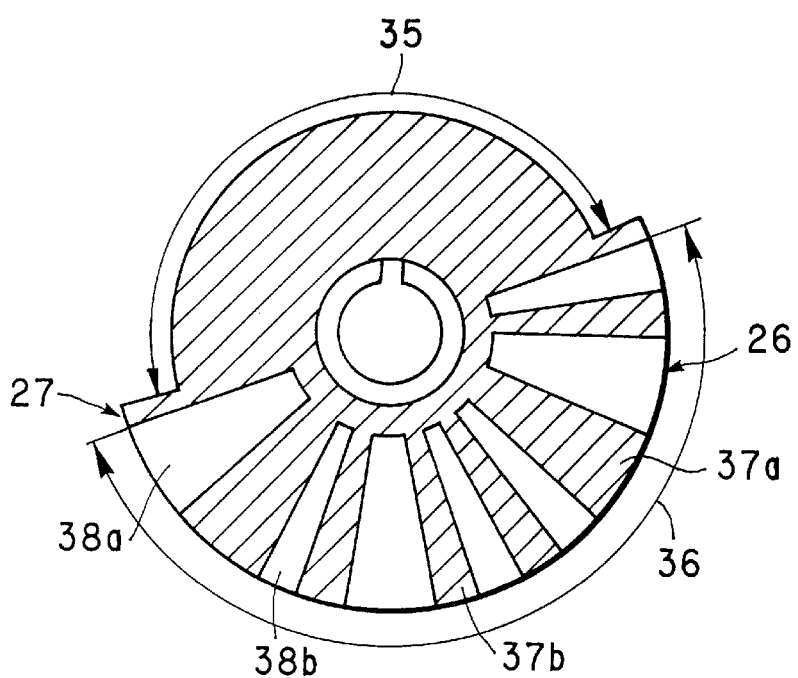
FIG. 3 is an explanatory view in plan, illustrating the data disk with a bar code.

In FIG. 3, an example of a code pattern 26 on the data disk 27 is illustrated. The code pattern 26 consists of a quiet zone 35 and a bar code portion 36. The quiet zone 35 is formed by partially cutting the data disk 27. The bar code portion 36 is a combination of black bars 37a and 37b having low reflectance and white bars 38a and 38b having high reflectance. When a photo sensor of a reflection type in the camera detects the quiet zone 35, the photo sensor operates in the same manner as detection of the black bars 37a and 37b. The quiet zone 35 has a sufficiently greater width than, or a sufficiently greater central angle than the black bars 37a and 37b. Thus the quiet zone 35 operates to define beginning and closing ends of the bar code portion 36.

The black bars 37a and 37b are black, but may have any other dark color. The white bars 38a and 38b are silver-white, but may have any other light color less dark than the black bars 37a and 37b. The white bars 38a and 38b have silver gloss, but may be white lacking silver gloss.

In the bar code portion 36, the black bar 37a is relatively wide. The black bar 37b is relatively narrow. The white bar 38a is relatively wide. The white bar 38b is relatively narrow. The black and white bars 37a, 37b, 38a and 38b are combined and arranged to constitute a rotary bar code representing information, including photo film sensitivity and the number of available photographable frames of the photo film 12. A black surface adjacent to the quiet zone 35 is treated as an additional area of the quiet zone 35. While the data disk 27 rotates with the spool 13, a photo sensor of the camera or a photographic printer detects the code pattern 26 to read the information represented by the bar code portion 36.

The central angle of the quiet zone 35 and the central angles and arrangement of the black and white bars 37a, 37b, 38a and 38b are predetermined. For example, the quiet zone 35 is approximately 170° wide. Each of the black and white bars 37a, 37b, 38a and 38b has a range from 3° to 40°. For example, the wider bars 37a and 38a are 20° wide. The narrower bars 37b and 38b are 10° wide. The bar code portion 36 consists in 13 bars in total, which include seven (7) white bars and six (6) black bars. The key way 28a of the spool 13 is predetermined with reference to the data disk 27.

In FIGS. 4A–4D, positions of the key way 28a, the indicator plate 31 and the data disk 27 are illustrated for each of the used statuses of the photo film 12. Shortly before removal of the photo film cassette 10 from a camera or photographic printer, the spool 13 of the photo film cassette 10 is stopped in one of an unexposed position Us of FIG. 4A, a partially exposed position Ps of FIG. 4B, an exposed position Es of FIG. 4C, and a developed position Prs of FIG. 4D according to one of the used statuses. An arrangement of the unexposed position Us, the partially exposed position Ps, the exposed position Es and the developed position Prs follows the rewinding direction of winding the photo film 12. Angular intervals between them are of course predetermined.

Figure 4A:
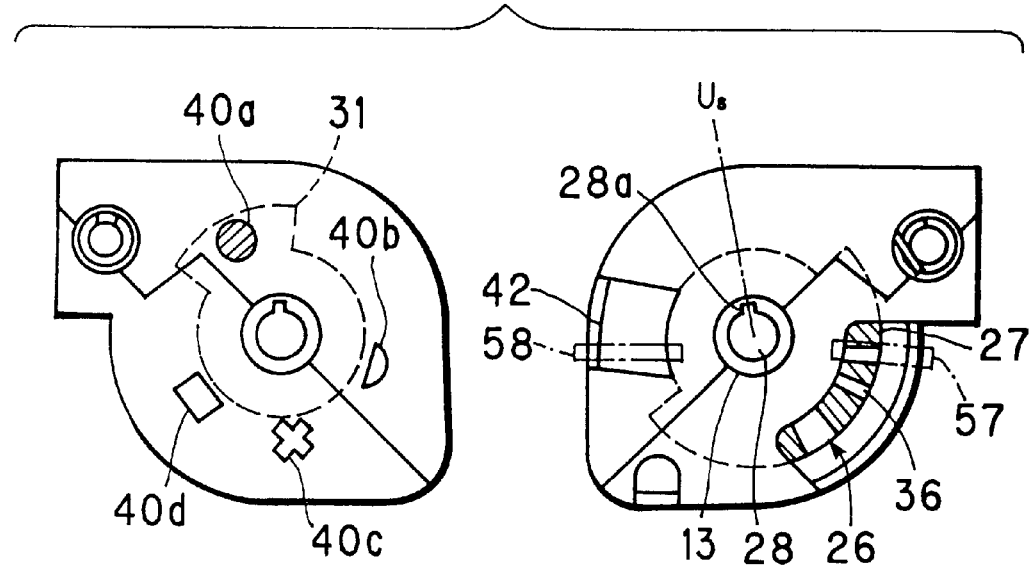
FIG. 4A is an explanatory view in plan, illustrating end faces of the cassette where an unexposed status is indicated.

In FIG. 4A, the spool 13 is stopped in the unexposed position Us. In this state, the indicator plate 31 appears through a circular window 40a among indicator windows 40a–40d in a face of the cassette shell 11, to indicate an unexposed status of the photo film 12. In the other end face of the cassette shell 11, there are a first opening 41 and a second opening 42. When the spool 13 is in the unexposed position Us, the bar code portion 36 of the data disk 27 appears in the first opening 41, and the quiet zone 35 appears in the second opening 42.

Note that the indicator plate 31 has a white surface appearing through the indicator windows 40a–40d, which are formed in the black wall of the cassette shell 11. In the left halves of FIGS. 4A–4D, the hatched portions are white. In the right halves of FIGS. 4A–4D, the hatched portions are black.

Figure 4B:
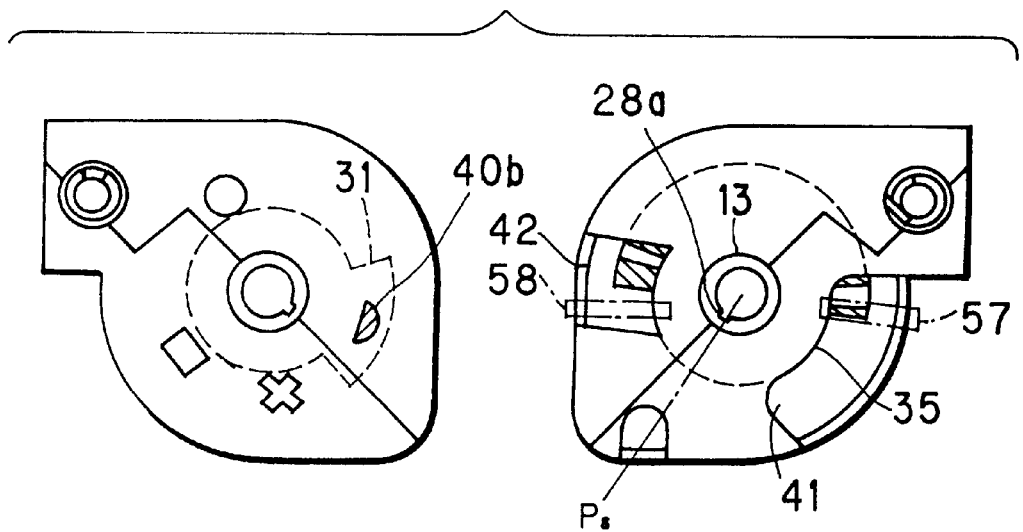
FIG. 4B is an explanatory view in plan, illustrating the end faces of the cassette where a partially exposed status is indicated.

In FIG. 4B, the spool 13 is stopped in the partially exposed position Ps, where the indicator plate 31 appears through the semi-circular window 40b to indicate that only part of available frames are exposed with the remainder unexposed. Nearly all of the quiet zone 35 is located from the first opening 41 in the rewinding direction to the second opening 42. A closing end of the bar code portion 36 slightly appears at one side of the first opening 41 as viewed in the counterclockwise direction. The quiet zone 35 appears in a greater part of the first opening 41 near to all of it. A beginning end of the bar code portion 36 slightly appears at one side of the second opening 42. The quiet zone 35 appears in a greater part of the second opening 42 near to all of it.

Figure 4C:
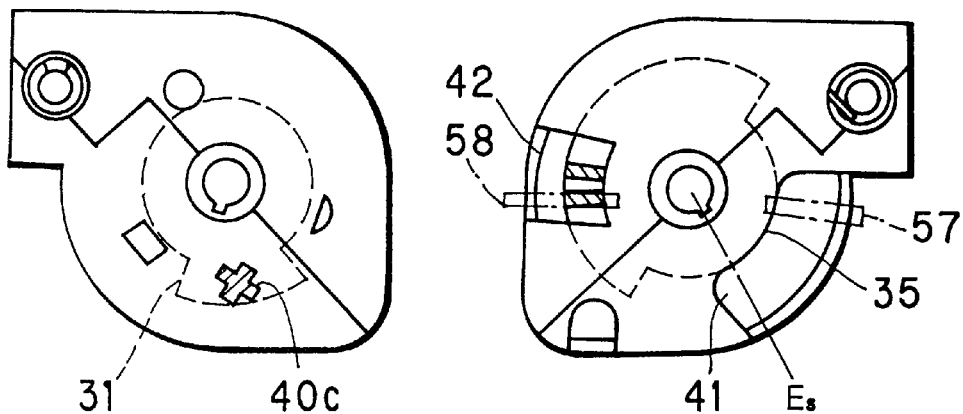
FIG. 4C is an explanatory view in plan, illustrating the end faces of the cassette where an exposed status is indicated.
Figure 4D:
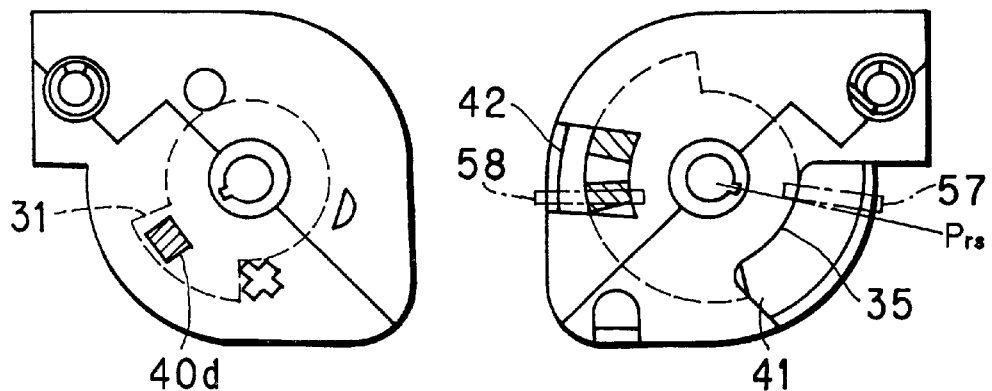
FIG. 4D is an explanatory view in plan, illustrating the end faces of the cassette where a developed status is indicated.

In FIG. 4C, the spool 13 is stopped in the exposed position Es, where the indicator plate 31 appears through the cross-shaped window 40c to indicate that all available frames are exposed. In FIG. 4D, the spool 13 is stopped in the developed position Prs, where the indicator plate 31 appears through the square window 40d to indicate that the photo film 12 is developed. In either of the exposed position Es and the developed position Prs, the quiet zone 35 appears through the first opening 41, and the bar code portion 36 appears through the second opening 42.

Figure 5:
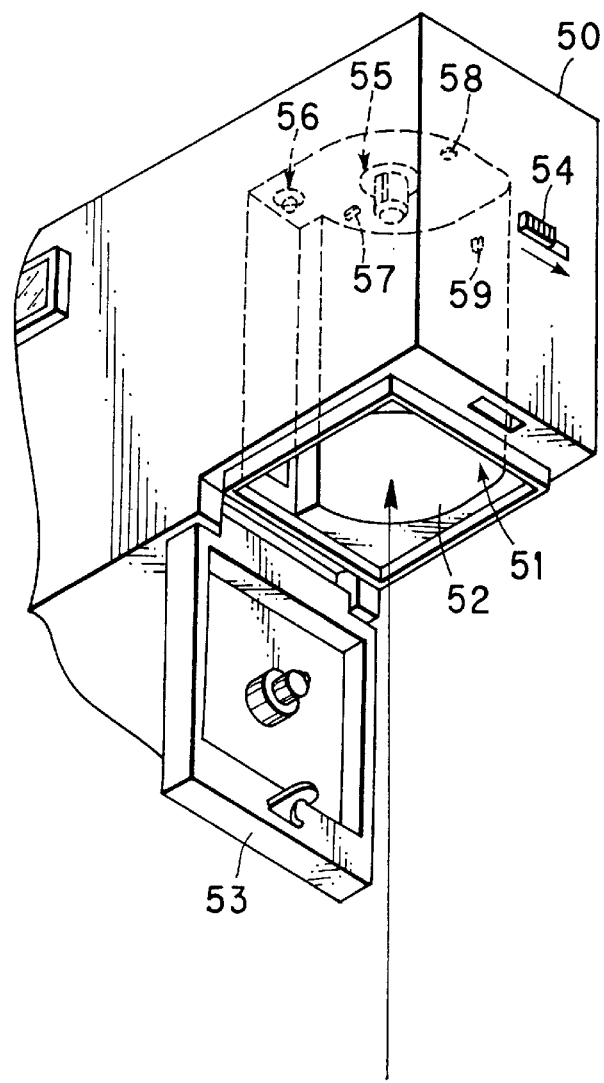
FIG. 5 is a perspective, partially cutaway, illustrating a loading chamber of a camera with the cassette.

In FIG. 5, a camera 50 for use with the photo film cassette 10 is illustrated. The camera 50 includes a construction for discerning one used status of the photo film cassette 10 among the unexposed status, the partially exposed status, and the remaining statuses including the exposed status and the developed status. The camera 50 has a loading chamber 51 of which a bottom is open at a bottom opening 52. The bottom opening 52 is closed by a bottom lid 53 being openable. When a slidable lock button 54 outside the camera 50 is slid in the arrow direction, the bottom lid 53 being closed is locked in the closed state. When the lock button 54 is slid opposite to the arrow direction, the bottom lid 53 is unlocked and openable. The bottom lid 53 can be opened to load and unload the photo film cassette 10.

The photo film cassette 10 is inserted into the loading chamber 51 with the data disk 27 directed upwards. On an inner top face of the loading chamber 51, there are disposed a spool drive shaft 55 and an opener drive shaft 56. The spool drive shaft 55 is located to confront with the engaging hole 28 of the spool 13. The opener drive shaft 56 is located to confront with the engaging hole 22 of the cassette shutter 21. The drive shafts 55 and 56 are respectively inserted into the engaging holes 28 and 22 of the photo film cassette 10.

A first photo sensor 57 is disposed in a position confronted with the first opening 41. A second photo sensor 58 is disposed in a position confronted with the second opening 42. The photo sensors 57 and 58 have the positions so determined that, the photo sensors 57 and 58 are confronted with the quiet zone 35 when, in FIG. 4B, the photo film cassette 10 having the partially exposed status is inserted. The second photo sensor 58 is nearly confronted with one side of the second opening 42 as viewed in the counterclockwise direction. This is for the purpose of reliable detection of the quiet zone 35 for a period when the photo film cassette 10 having the partially exposed status is inserted and if Instability 1 occurs with the data disk 27. Instability 1 will be described later in detail.

The photo sensors 57 and 58 are photo sensors of a reflection type. Each of the photo sensors 57 and 58 includes a beam projector section and a beam receiving section. The beam projector section projects a detecting beam toward the quiet zone 35 and the bar code portion 36. If the beam is reflected by the bar code portion 36, the beam is received by the beam receiving section to output a photoelectric signal, which has a value in accordance with light intensity of the reflected beam.

A contact member 59 is disposed inside the loading chamber 51 for detecting removal of the photo film cassette 10 from the loading chamber 51. The contact member 59 is movable between loaded and unloaded positions, and when in the loaded position, is protruded into a moving path of the cassette shell 11, and when in the unloaded position, is flush with the inside of the loading chamber 51 without protrusion. When the cassette shell 11 is inserted, the contact member 59 contacts the cassette shell 11 and pushed to move to the loaded position. When the cassette shell 11 is pulled or moved down toward the bottom opening 52, the spool 13 is disengaged from the spool drive shaft 55. Upon this disengagement, the contact member 59 is released from the push of the cassette shell 11, and moved to the unloaded position.

Figure 6:
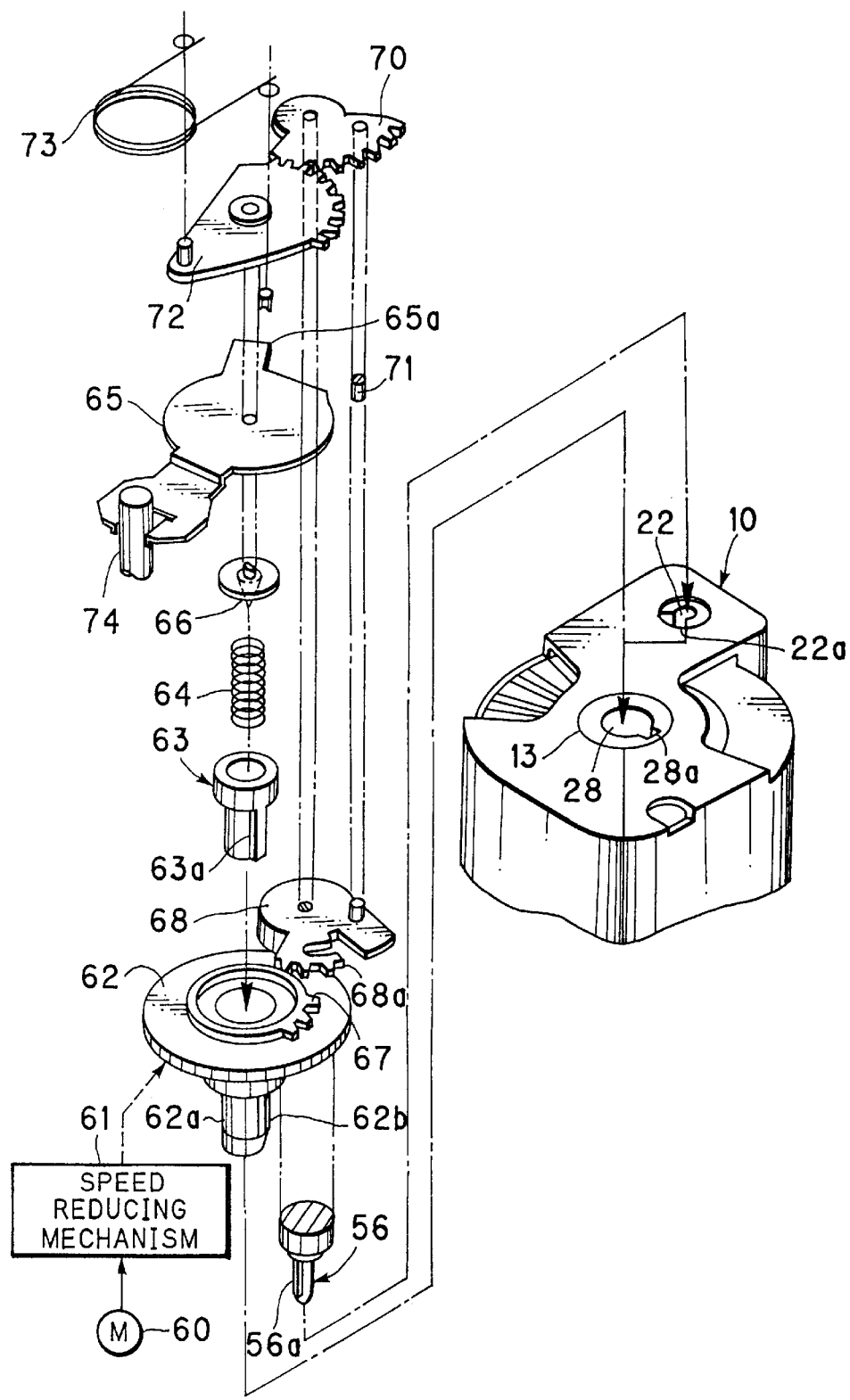
FIG. 6 is an exploded perspective, partially cutaway, illustrating a spool drive shaft and its relevant mechanism with the cassette.

In FIG. 6, rotation of a motor 60 incorporated in the camera 50 is transmitted to a spool gear 62 via a speed reducing mechanism 61. A shaft portion 62a is formed integrally with a bottom of the spool gear 62, and is insertable in the engaging hole 28 of the spool 13. An inner rod 63 is inserted into the shaft portion 62a in a slidable manner. The inner rod 63 has an engaging projection 63a, which is engageable with the key way 28a. The shaft portion 62a has a groove 62b, through which the engaging projection 63a protrudes outwards. The shaft portion 62a and the engaging projection 63a are combined together to constitute the spool drive shaft 55.

A coil spring 64 is disposed on the top of the inner rod 63, and is pressed downwards by a pressing portion 66 formed with a linking lever 65. Thus the coil spring 64 biases the inner rod 63 down toward a bottom of the camera. Even when the key way 28a of the photo film cassette 10 is not engaged with the engaging projection 63a of the spool drive shaft 55, the engaging projection 63a is moved up against the bias of the coil spring 64, and allowed to enter the engaging hole 28 of the shaft portion 62a. When the spool drive shaft 55 rotates sufficiently to set the engaging projection 63a in the position of the key way 28a, the bias of the coil spring 64 slides the engaging projection 63a down and engages it with the key way 28a.

The spool drive shaft 55 is hereinafter described to be in one of an unexposed position Ud, a partially exposed position Pd, an exposed position Ed, and a developed position Prd. The unexposed position Ud is so defined that the key way 28a of the spool 13 stopped in the unexposed position Us is engaged with the engaging projection 63a of the spool drive shaft 55 in the same position. Similarly, the partially exposed position Pd is defined in association with the partially exposed position Ps. The exposed position Ed is defined in association with the exposed position Es. The developed position Prd is defined in association with the developed position Prs. It is to be noted that the developed position Prd is not used in the stopping control of the camera.

A three-toothed sector gear 67 is formed integrally with the top of the spool gear 62. When the spool drive shaft 55 rotates in the counterclockwise direction, the three-toothed sector gear 67 is meshed with a sector gear 68*a* of an opener rotating member 68, and rotates the opener rotating member 68 in the clockwise direction. The opener drive shaft 56 is formed integrally with a bottom of the opener rotating member 68 and in a concentric manner with the opener rotating member 68. There is an engaging projection 56*a* formed on a cylindrical portion of the opener drive shaft 56, and engageable with the key way 22*a* of the cassette shutter 21.

The opener rotating member 68 is connected with a first sector gear 70 by a linking pin 71. The opener rotating member 68 and the first sector gear 70 rotates together in a concentric manner. The first sector gear 70 is meshed with a second sector gear 72. In insertion of the photo film cassette 10, the second sector gear 72 is biased by a toggle spring 73 in a clockwise direction.

The linking lever 65 is formed integrally with a bottom of the second sector gear 72 and in a concentric manner with the second sector gear 72. The linking lever 65 is rotated by a drive pin 74, which is swung by operation of the lock button 54. The linking pin 71 is disposed in a moving path of a protruding end 65*a* of the linking lever 65.

In FIGS. 7A–7D, movement of the spool gear 62, the opener rotating member 68 and the like is schematically depicted. When the bottom lid 53 is locked, the protruding end 65*a* of the linking lever 65 is away from the opener rotating member 68 in FIG. 7A in the counterclockwise direction. The toggle spring 73 biases the opener rotating member 68 in the counterclockwise direction via the second sector gear 72, the first sector gear 70 and the linking pin 71. When the motor 60 is rotated in reverse, the spool gear 62 is rotated in the counterclockwise direction, to cause the spool drive shaft 55 to rotate in the rewinding direction. With the spool gear 62 rotated, the three-toothed sector gear 67 is also rotated in the counterclockwise direction.

When the three-toothed sector gear 67 comes in mesh with the sector gear 68*a*, the opener rotating member 68 and the first sector gear 70 being connected together are rotated in the clockwise direction as illustrated in FIG. 7B. Rotation of the opener rotating member 68 causes the opener drive shaft 56 to rotate in a rotational direction associated with that from the closed position of the cassette shutter 21 to its open position. The first sector gear 70 rotates the second sector gear 72 in the counterclockwise direction against the bias of the toggle spring 73.

The opener rotating member 68 further rotates, so that the second sector gear 72 rotates by a predetermined angle. In FIG. 7C, the toggle spring 73 is shifted in reverse, so as to change its direction for biasing the second sector gear 72 to an opposite direction. The bias of the toggle spring 73 causes the second sector gear 72 to rotate in the clockwise direction. Also the opener rotating member 68 rotates clockwise by means of the first sector gear 70 and the linking pin 71. The sector gear 68*a* is rotated to a retracted position away from a moving path of the three-toothed sector gear 67, and kept in the retracted position. The opener drive shaft 56 rotates to a position associated with an open position of the cassette shutter 21. Accordingly the three-toothed sector gear 67 does not come in mesh with the sector gear 68*a* any more even the spool gear 62 subsequently rotates clockwise or counterclockwise.

To remove the photo film cassette 10, the lock button 54 is slid to the unlocked position of the bottom lid 53. In FIG. 7D, the drive pin 74 rotates the linking lever 65 in the clockwise direction. The protruding end 65*a* of the linking lever 65 pushes the linking pin 71 in the clockwise direction. Each of the opener rotating member 68, the sector gears 70 and 72 are rotated in a direction respectively reverse to the former direction, rotated against the bias of the toggle spring 73. Also the biasing direction of the toggle spring 73 is changed to an opposite direction. Thus the opener drive shaft 56 is rotated in a rotational direction associated with that from the open position of the cassette shutter 21 to its closed position. Note that, in FIGS. 7A and 7D, the spool drive shaft 55 is in the exposed position Ed.

When the spool drive shaft 55 is rotating in a section near to the developed position Prd, the spool drive shaft 55 comes into an opening movement region where the three-toothed sector gear 67 comes in mesh with the sector gear 68*a*. If an opening movement region for the spool gear 62 should be determined near to the exposed position Ed or the unexposed position Ud, the position of the opener drive shaft 56 would be variable. The cassette shutter 21 would not be rotated to the closed position before removal of the photo film cassette 10. Or, when another cassette 10 is inserted, the opener drive shaft 56 without the closed position would be pressed against the cassette shutter 21 in the closed position, to break the opener drive shaft 56 or the cassette shutter 21. However there is no event in the camera to stop the spool drive shaft 55 in the developed position Prd when the photo film 12 is used. Thus the opening movement region is determined near to the developed position Prd for the purpose of opening the cassette shutter 21.

In FIG. 8 illustrating an electrical construction of the camera 50, a RAM 80*a* and a ROM 80*b* are connected to a microcomputer 80. The RAM 80*a* stores data required for various controls in a provisional manner, and is bused as a work memory. The ROM 80*b* stores a program for executing the various controls. The microcomputer 80 controls relevant circuits of the camera 50 in accordance with the program in the ROM 80*b*.

A photoelectric signal from the first photo sensor 57 is sent to a binarizing circuit 81. The binarizing circuit 81 binarizes the photoelectric signal at a threshold level determined suitably, and outputs a first bar code signal. The first bar code signal, when the first photo sensor 57 detects the white bars 38*a* and 38*b*, has a "High" level, and when the first photo sensor 57 detects the black bars 37*a* and 37*b* and the quiet zone 35, has a "Low" level. The first bar code signal is sent to a border detector circuit 82, a first width pulse counter 83, and the microcomputer 80. Similarly, a binarizing circuit 88 converts a photoelectric signal from KP8320 the second photo sensor 58 into a second bar code signal, which is sent into a second width pulse counter 89.

The border detector circuit 82 generates a count-up signal in response to a change of the first bar code signal from the "High" level to the "Low" level, or from the "Low" level to the "High" level, and sends the count-up signal to a counter 84. Before the first photo sensor 57 detects the code pattern 26, a border number Ct counted in the counter 84 is reset by the microcomputer 80 as zero (0). Upon each count-up signal being input, the counted border number Ct of the counter 84 is incrementally stepped by one. The counted border number Ct counted by the counter 84 is the number of borders respectively defined between one of the white bars 38*a* and 38*b* and one of the black bars 37*a* and 37*b* and the quiet zone 35 in a range of the code pattern 26 in view of the position of the first photo sensor 57.

A motor driver 85 is controlled by the microcomputer 80, and rotates the motor 60 forwards or in reverse. A spool drive mechanism 86 is constituted by the speed reducing mechanism 61 and the spool gear 62. When the motor 60 rotates, the spool drive mechanism 86 rotates the spool gear 62 and thus the spool 13. A shutter-opener mechanism 87 includes the three-toothed sector gear 67, the opener rotating member 68, and the sector gears 70 and 72, and causes the opener drive shaft 56 to rotate the cassette shutter 21 in association with rotation of the spool gear 62.

A rotational position detector 86a typically consists of a rotary encoder, which is constituted by an encoder disk, a photo interrupter, and a pulse generator. The encoder disk has a great number of radially directed regular slits, and is rotated by transmission of rotation of the motor 60 via the spool drive mechanism 86 thereto. The photo interrupter monitors and detects passage of each of the slits by one position. The pulse generator generates one encode pulse upon detection of one of the slits with the photo interrupter from the encoder disk. All of the motor 60, the spool drive shaft 55 and the encoder disk are rotatable at the same time and regularly by respective rotational angles being predetermined, so that the rotary encoder 86a generates the one encode pulse each time the spool drive shaft 55 rotates by the regular rotational angle. The encode pulse is sent to the first width pulse counter 83 and the second width pulse counter 89.

It is to be noted that an encoder may be directly connected to a rotary shaft of the motor 60 to generate encode pulses. Other devices may be used for generating an encode pulse each time the spool drive shaft 55 rotates by a predetermined angle.

The first width pulse counter 83 counts encode pulses to obtain a first pulse number Cp1. The first pulse number Cp1 is reset as zero (0) in response to a change of the first bar code signal from the "High" level to the "Low" level, or from the "Low" level to the "High" level. The first pulse number Cp1 of the first width pulse counter 83 represents an angle by which the spool drive shaft 55 rotates while the first photo sensor 57 is detecting any one of the white bars 38a and 38b, the black bars 37a and 37b, and the quiet zone 35. The first width pulse counter 83 sends the first pulse number Cp1 to the microcomputer 80. The first width pulse counter 83 is also used in the control of stopping the spool drive shaft 55. For this additional purpose, the microcomputer 80 forcibly causes the first width pulse counter 83 to continue a counting operation irrespective of the first bar code signal.

A second pulse number Cp2 of the second width pulse counter 89, in response to receiving one encode pulse, is stepped incrementally only while the second bar code signal has a "Low" level. Before operation of the second photo sensor 58, the second pulse number Cp2 of the second width pulse counter 89 is reset at zero (0) by the microcomputer 80. After the resetting, the second width pulse counter 89 is stopped from counting upon receipt of the second bar code signal of the "High" level. The second width pulse counter 89 counts encode pulses only when the black bar 37a or 37b or the quiet zone 35 exists at the second photo sensor 58 upon starting rotation of the spool drive shaft 55. The second pulse number Cp2 is sent to the microcomputer 80 for the purpose of judging whether the quiet zone 35 existed at the second photo sensor 58 upon the start of rotating the spool drive shaft 55.

The second width pulse counter 89 counts encode pulses only while the second bar code signal is initially at the "Low" level. It is to be noted that the second width pulse counter 89 may be so constructed as to count encode pulses until a change of the second bar code signal occurs for the first time. This is because existence of the quiet zone 35 can be recognized without fail according to the second pulse number Cp2 from the second width pulse counter 89 being modified. There is no possibility that the number of generated encode pulses during detection of any of the white bars 38a and 38b and the black bars 37a and 37b becomes higher than a "second reference number", which is determined in a manner later to be described.

The microcomputer 80 evaluates the level of the first bar code signal and the first pulse number Cp1, and detects the quiet zone 35 and the bar code portion 36. A sequential pattern including the quiet zone 35, the bar code portion 36 in an acceptable manner, and again the quiet zone 35 is recognized. Upon finish of one-time detection of the sequential pattern, the counted border number Ct stops being counted. According to the counted border number Ct and the second pulse number Cp2, an initial position of the spool 13, thus the initial position of the data disk 27, is detected, so as to recognize one of statuses of the photo film 12 in the photo film cassette 10 having been loaded.

The detection of the bar code portion 36 with evaluation is based on satisfaction of both of Conditions 1 and 2 as follows:

Condition 1. The first pulse number Cp1 counted during occurrence of the first bar code signal at the "High" level or the "Low" level is equal to a number associated with each angle of the black and white bars 37a, 37b, 38a and 38b.

Condition 2. The first pulse number Cp1 satisfying condition 1 is obtained for 13 times consecutively. The quiet zone 35 both was detected before those 13 times and is detected after those 13 times.

While the first bar code signal is at the "Low" level, the microcomputer 80 judges that the first pulse number Cp1 comes up to a "third reference number", namely a number of encode pulses during rotation of the spool drive shaft 55 by 90 degrees, so that the microcomputer 80 determines that the first photo sensor 57 is confronted with the quiet zone 35. If an incomplete portion of the bar code portion 36 is detected without satisfying Conditions 1 and 2, the microcomputer 80 determines that confrontation of the first photo sensor 57 with the quiet zone 35 was wrong, and is operated for another time of detecting the quiet zone 35. It is to be noted that a tolerable range in consideration of errors in measurement may be used for the purpose of comparison of the first pulse number Cp1 with a reference pulse number defined by the width of the black and white bars 37a, 37b, 38a and 38b.

To discern the used status, the counted border number Ct of the counter 84 is read at the time of finishing the reference detecting sequence. If the counted border number Ct is greater than a "first reference number" which is a value "20", then the photo film 12 in the photo film cassette 10 is detected as unexposed. If the counted border number Ct is equal to or smaller than the first reference number, it is checked whether the second pulse number Cp2 is equal to or greater than the second reference number. If it is, then the quiet zone 35 was confronted with the second photo sensor 58 at the inserting time, to detect the photo film 12 in the photo film cassette 10 as partially exposed. If it is the second pulse number Cp2 is smaller than the second reference number, then the quiet zone 35 was confronted with the bar code portion 36 at the inserting time, to detect the photo film 12 in the photo film cassette 10 as exposed or developed. The photo film 12 is unusable for further exposures.

If the photo film cassette 10 has a status different from the unexposed status, the quiet zone 35 exists at the first photo sensor 57 upon the start of operation of the first photo sensor 57. The number of borders detected by the first photo sensor 57 at the end of the reference detecting sequence is 14, which is the number of borders of the code pattern 26 through one complete rotation. If the photo film 12 is partially exposed, it is likely that the closing end of the bar code portion 36 exists at the first photo sensor 57 upon the start of the detection. The counted border number may be varied in a range from +1 to +3.

If the photo film cassette 10 being inserted has the unexposed status, an initial half of the bar code portion 36 exists at the first photo sensor 57 upon start of the detection. Even if the data disk 27 has started rotating stably, the counted border number Ct is 21 at the finish of the reference detecting sequence, because the number seven (7) of the borders in the later half of the bar code portion 36 is added to the number 14 of the borders of the entirety of the bar code portion 36. Therefore it is possible to set the first reference value in a range from 14 (+1, +2 or +3) to 21 for comparison with the counted border number Ct so as to enable discernment of the unexposed status and other statuses. In the present embodiment, the first reference value is preset 20. Of course the first reference value should be changed if the bar code portion 36 has a different number of the black and white bars 37a, 37b, 38a and 38b.

Note that, according to experiments, four aspects of instabilities have been observed.

Instability 1. Immediately after the start of rotating the spool drive shaft 55, the spool 13 and the data disk 27 are instable as they tend to rotate in reverse or stop. For example, the cassette shutter 21 is in the closed position, and the engaging projection 63a of the spool drive shaft 55 is not engaged with the key way 28a of the spool 13. The spool 13 is provided with force for rotation by friction between the engaging hole 28 of the spool 13 and the shaft portion 62a. However the spool 13 is locked. The spool 13 is firmly kept from rotating. Otherwise the spool 13 makes abrupt reciprocal rotations in a small range. Of course the data disk 27 behaves in the same manner. This behavior is hereinafter referred to as Instability 1.

Instability 2. When the cassette shutter 21 is in the closed position, and when the engaging projection 63a is engaged with the key way 28a, the data disk 27 rotates with stops and minute reverse rotation, because the spool 13 rotates forcibly in moving the lock lever 32 repetitively past the gear 30 of the spool lock mechanism back and forth. This behavior is hereinafter referred to as Instability 2.

Instability 3. The spool gear 62 rotates in the opening movement region. The three-toothed sector gear 67 is meshed with the sector gear 68a to rotate the opener rotating member 68 against the bias of the toggle spring 73. The data disk 27 rotates unstably in a manner irrespective of engagement between the engaging projection 63a and the key way 28a. The data disk 27 happens to stop or abruptly rotate in reverse. This behavior is hereinafter referred to as Instability 3.

Instability 4. Even after the cassette shutter 21 comes to the open position, the engaging projection 63a is not engaged with the key way 28a. Friction between the engaging hole 28 and the shaft portion 62a causes the data disk 27 either to rotate forwards or to stop, but without rotating in reverse. This behavior is hereafter referred to as Instability 4. Note that, if the engaging projection 63a is engaged with the key way 28a after the cassette shutter 21 comes to the open position, the data disk 27 rotates with the spool drive shaft 55 smoothly and stably.

FIG. 9 illustrates relative movement of the photo sensors 57 and 58 relative to the code pattern 26 when the spool 13 is rotated in the rewinding direction at the time that the spool drive shaft 55 is in the exposed position Ed and that the photo film cassette 10 having each status is loaded. Similarly, FIG. 10 illustrates relative movement of the photo sensors 57 and 58 at the time that the spool drive shaft 55 is in the partially exposed position Pd. FIG. 11 illustrates relative movement of the photo sensors 57 and 58 at the time that the spool drive shaft 55 is in the unexposed position Ud. In FIGS. 9–11, a vertical axis is taken as a virtual code pattern into which the code pattern 26 is linearly converted. A sign Sd indicates a moving state of the spool drive shaft 55. For the purpose of simplification, a term "combination" or "mode" is used for a combination of one position of the spool 13 and one position of the spool drive shaft 55 during the loading operation. For example, Combination Es/Ed is a combination of the exposed position Es of the spool 13 and the exposed position Ed of the spool drive shaft 55 during the loading operation.

When in Combination Es/Ed of FIG. 9, the engaging projection 63a of the spool drive shaft 55 is engaged with the key way 28a. Before the cassette shutter 21 comes to the open position, the spool lock state is maintained. The data disk 27 moves with Instability 2 upon the start of rotation of the spool drive shaft 55. While the spool gear 62 rotates in the opening movement region, the data disk 27 moves with Instability 3. After the spool gear 62 passes the opening movement region, the data disk 27 rotates with the spool drive shaft 55 stably.

When in Combination Prs/Ed, the engaging projection 63a does not meet a position of the key way 28a in the course of cassette insertion. The engaging projection 63a is not engaged with the key way 28a. Before the cassette shutter 21 comes to the open position, the spool stands locked. The data disk 27 initially moves with Instability 1. During rotation of the spool gear 62 past the opening movement region, the engaging projection 63a comes in engagement with the key way 28a. In the opening movement region, the data disk 27 moves with Instability 3. Then the data disk 27 comes to rotate stably.

When in Combination Us/Ed, the engaging projection 63a does not meet the position of the key way 28a during the cassette insertion. The data disk 27 initially moves with Instability 1, and then with Instability 3. After this, the friction between the shaft portion 62a and the spool 13 causes the data disk 27 to move with Instability 4, because the key way 28a is in a position ahead of that of the engaging projection 63a. In most of the cases, the engaging projection 63a becomes engaged with the key way 28a before the start of next recognition of the quiet zone 35 with the first photo sensor 57. Then the data disk 27 stably rotates.

Referring to Combination Ps/Ed, the engaging projection 63a does not meet the position of the key way 28a in the course of the cassette insertion. The engaging projection 63a is not engaged with the key way 28a. The data disk 27 initially moves with Instability 1, and then moves with Instability 3, next with Instability 4, and then comes to rotate stably. Nearly every time the data disk 27 stably rotates before the start of detecting the bar code portion 36 with the first photo sensor 57.

In Combination Ps/Pd and Combination Us/Ud of FIGS. 10 and 11, the data disk 27 moves with Instability 2 and then with Instability 3, before it rotates stably, in a manner similar to Combination Es/Ed. In Combination Es/Pd, Combination Ps/Ud and Combination Es/Ud, the data disk 27 moves with Instability 1, with Instability 2 and then with Instability 3, before it rotates stably. In Combination Prs/Pd and Combination Prs/Ud, the data disk 27 moves with Instability 1, with Instability 3 and then with Instability 3, before it rotates stably, in a manner similar to Combination Prs/Ed.

When in Combination Us/Ed, Combination Us/Pd and Combination Us/Ud with the photo film cassette 10 unexposed, the bar code portion 36, upon the start of operating the first photo sensor 57, exists at the first photo sensor 57 while with Instability 1 or Instability 2 and Instability 3 of the data disk 27. The counted border number Ct is likely to increase extraordinarily while with Instability 1, 2 or 3. Subsequently the reference detecting sequence is executed during stable rotation of the data disk 27. As depicted in an upper half of in FIG. 12, the reference detecting sequence has been started after initial detection of a halfway part of the bar code portion 36. The counted border number Ct with the first photo sensor 57 comes equal to or more than the first reference number. Thus acceptable loading of the photo film cassette 10 having the photo film unexposed can be checked and confirmed.

Whichever of the combinations with the insertion of the photo film cassette 10 having the exposed, partially exposed, or developed status, the first photo sensor 57 is confronted with the quiet zone 35 whether Instability 1, 2, 3 or 4 of the data disk 27 occurs or not. The counted border number Ct does not increase during this occurrence.

Immediately after inserting the photo film cassette 10 having the partially exposed status or exposed status, there is an angle of 90° or more defined between the first photo sensor 57 and the bar code portion 36. During detection of the quiet zone 35, encode pulses in a number equal to or more than the third reference number are generated. Consequently existence of the quiet zone 35 can be recognized exactly. Immediately after inserting the photo film cassette 10 having the developed status, there is an angle slightly smaller than 90° defined between the first photo sensor 57 and the bar code portion 36. The spool drive shaft 55, while with Instability 1, rotates by a greater angle than the data disk 27. Again existence of the quiet zone 35 can be recognized.

Before the quiet zone 35 moves past the first photo sensor 57, the spool gear 62 moves past the opening movement region. The data disk 27 comes to rotate stably with the spool drive shaft 55 before the bar code portion 36 comes to the position of the first photo sensor 57. While the data disk 27 rotates stably, the first photo sensor 57 detects the bar code portion 36 and the quiet zone 35 following the bar code portion 36. In the used statuses different from the unexposed status, the reference detecting sequence is started upon the start of rotating the spool drive shaft 55, as indicated in a lower half of FIG. 12. The counted border number Ct becomes the number of the borders of the whole of the code pattern 26. Accordingly it is possible to detect a used status different from the unexposed status.

If the photo film cassette 10 has a status different from the unexposed status, the data disk 27 in Combination Es/Ed initially moves with Instability 2. Upon the start of rotating the spool drive shaft 55, the second photo sensor 58 detects the bar code portion 36. The second bar code signal changes immediately after the start of rotating the spool drive shaft 55. The second bar code signal is initially at the "Low" level and then becomes the "High" level. Or else it is initially at the "High" level. Therefore the second pulse number Cp2 is zero (0) or a small number near to zero. In any of Combination Prs/Ed, Combination Es/Pd and Combination Prs/Pd, it is likely during occurrence of Instability 1 that the second photo sensor 58 continues detecting one of the black bars 37a and 37b. The second pulse number Cp2 may increase over a proper value. However the second pulse number Cp2 is comparatively small in those Combinations, because Instability 2 or 3 follows Instability 1 upon a lapse of a short duration after the start of the Instability 1.

In Combination Ps/Ed, the data disk 27 moves initially with Instability 1 and then Instability 3. While with Instability 1 or 3, the second photo sensor 58 detects only the quiet zone 35, and outputs the second bar code signal at the "Low" level. The second bar code signal remains at the "Low" level in the course of rotation of the spool drive shaft 55 from the exposed position Ed to the partially exposed position Pd. The second pulse number Cp2 is still counted during rotation of the spool drive shaft 55 by a great angle. Thus the second pulse number Cp2 in Combination Ps/Ed becomes greater than that in any of Combination Prs/Ed, Combination Es/Pd, Combination Prs/Pd and Combination Es/Ed.

It is preferred that the second reference value is predetermined greater than a maximum of the second pulse number Cp2 on the condition of Combination Prs/Ed, Combination Es/Pd, Combination Prs/Pd and Combination Es/Ed. This makes it possible to discern the partially exposed status from the exposed and developed statuses when in those Combinations and Combination Ps/Ed.

In Combination Ps/Pd, the second photo sensor 58 detects the bar code portion 36 at the lapse of short time after detecting the quiet zone 35 while with Instability 2 upon starting the spool drive shaft 55. The second pulse number Cp2 is comparatively small. If the second reference number is predetermined in the above-noted manner, the second pulse number Cp2 counted in Combination Ps/Pd may be smaller than the second reference number, so that the partially exposed status is likely to be mistaken for the exposed or developed status. In contrast, if the second reference number is predetermined with suitability to the second pulse number Cp2 in Combination Ps/Pd, it is likely that the exposed or developed status is mistaken for the partially exposed status, for example in Combination Prs/Ed, Combination Es/Pd or Combination Prs/Pd.

When in Combination Es/Ud and Combination Prs/Ud, the second photo sensor 58 detects the bar code portion 36 during occurrence of Instability 1 occurring initially. Instability 1 continues until the spool drive shaft 55 in the unexposed position Ud comes to the exposed position Ed or the developed position Prd and becomes engaged with the spool 13. In this rotation, a rotational angle of the spool drive shaft 55 is considerably great. It is likely that the second pulse number Cp2 increases extremely because of continuous detection of one of the black bars 37a and 37b with the second photo sensor 58. If the second reference value is predetermined in the same manner as Combination Ps/Pd, the exposed or developed status is misread as the partially exposed status. If in turn the second reference value is predetermined with suitability to Combination Es/Ud and Combination Prs/Ud, then the partially exposed status is misread as the exposed or developed status when in Combination Prs/Ed, Combination Es/Pd, Combination Prs/Pd and the like.

In conclusion, the used status is misread in Combination Ps/Pd, Combination Es/Ud and Combination Prs/Ud no matter how the second reference value is predetermined. For the purpose of avoiding such a misreading operation, the camera of the present invention is constructed to preset the spool drive shaft 55 at the exposed position Ed as standby position standing by for receiving insertion of the photo film cassette 10. This is based on correctness in reading the used status no matter which of the used status the photo film cassette 10 has when inserted.

In FIG. 8, a detector switch 59a is connected to the microcomputer 80. The detector switch 59a is associated with the contact member 59, and when the contact member 59 is in the loaded position, is turned on, and when the contact member 59 is in the unloaded position, is turned off. When the detector switch 59a is turned off, the microcomputer 80 responsively causes the motor 60 to rotate in reverse. The spool drive shaft 55 is rotated in a direction to rotate the spool 13 in the rewinding direction, and controlled to stop in the exposed position Ed according to the first pulse number Cp1 monitored by the microcomputer 80. Note that the second width pulse counter 89 may be used for the control of the spool drive shaft 55 instead of the first width pulse counter 83. Furthermore, a counter specified for the control of the spool drive shaft 55 may be used instead of the first width pulse counter 83.

The second reference number is initially defined equal to a minimum to which the second pulse number Cp2 comes down in Combination Ps/Ed. Of course this preset second reference number is greater than a maximum to which the second pulse number Cp2 comes up in Combination Prs/Ed and Combination Es/Ed.

Figure 13:
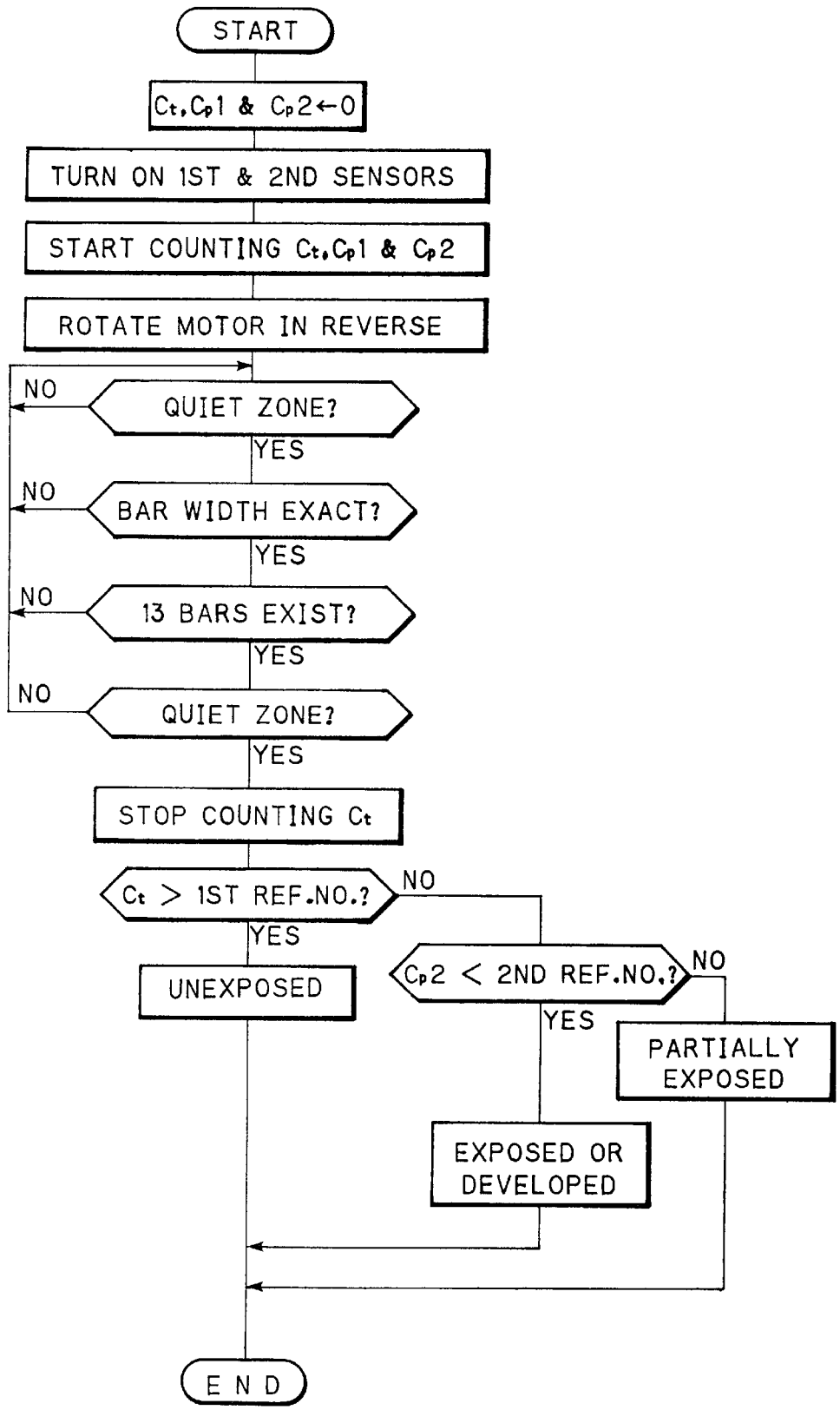
FIG. 13 is a flow chart illustrating a sequence of discriminating the used statuses of the photo film inserted.
Figure 14:
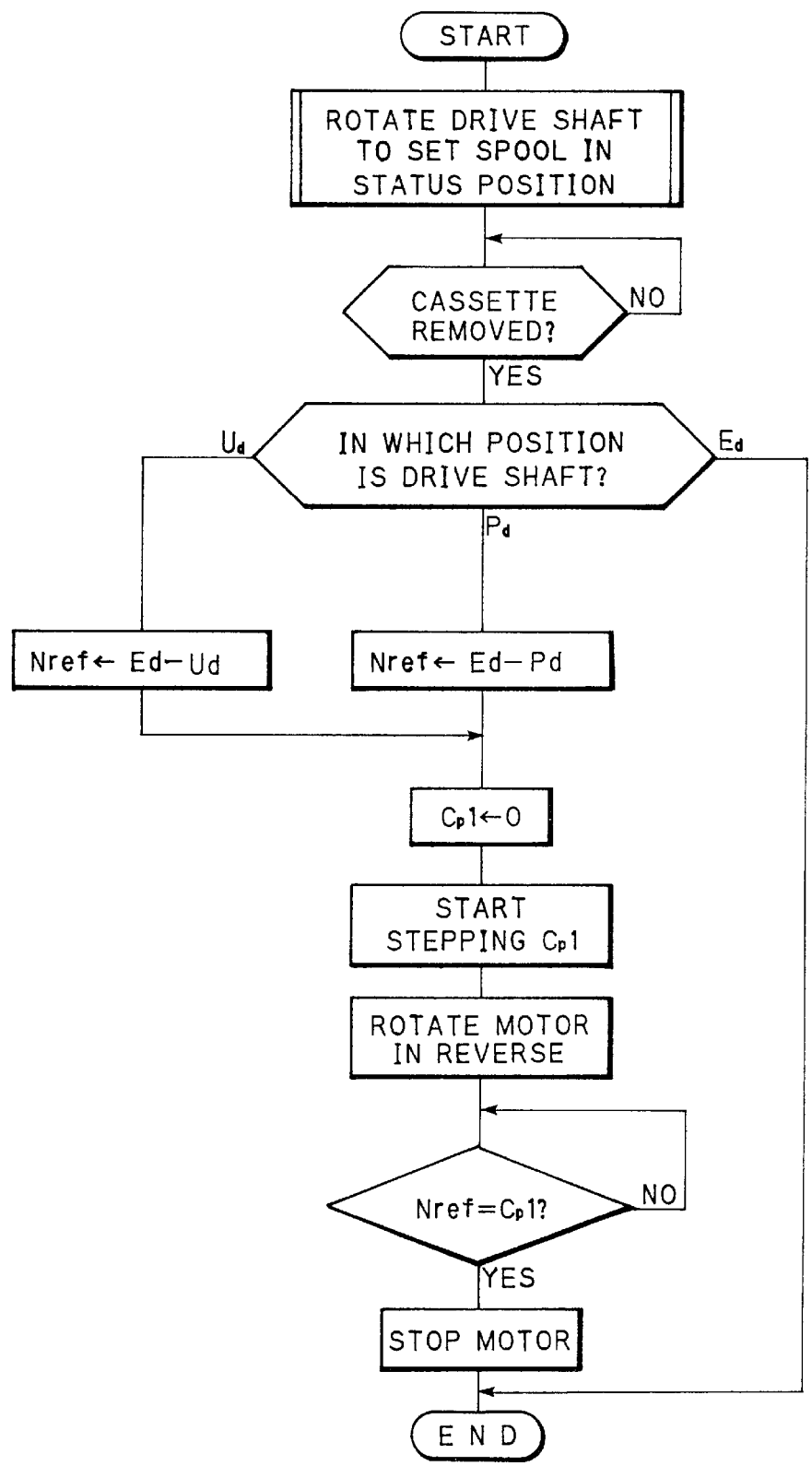
FIG. 14 is a flow chart illustrating a sequence for stopping the spool in an exposed position as standby position.

The operation of the above construction is used with reference to FIGS. 13 and 14. The bottom lid 53 is opened. The loading chamber 51 is loaded with the photo film cassette 10. The spool drive shaft 55 has been stopped in the exposed position Ed in an irrespective manner of the used status of the photo film cassette 10 previously removed. If the spool 13 of the photo film cassette 10 is in the exposed position Es, the shaft portion 62a is inserted in the engaging hole 28 of the spool 13. The engaging projection 63a is engaged with the key way 28a. If the engaging projection 63a does not meet the position of the key way 28a, a peripheral portion about the engaging hole 28 pushes upwards the engaging projection 63a against the bias of the coil spring 64, without engagement between the engaging projection 63a and the key way 28a. The opener drive shaft 56 is engaged with the engaging hole 22 of the cassette shutter 21 in the closed position.

When the photo film cassette 10 is inserted in the loading chamber 51, the contact member 59 is pushed by the cassette shell 11 and moved to a loaded position. The contact member 59 in the loaded position turns on the detector switch 59a.

With the bottom lid 53 closed, the lock button 54 is slid to lock the bottom lid 53. A lid-closing signal is sent to the microcomputer 80. Upon the lid-closing signal, the microcomputer 80 resets the counter 84 to set zero (0) as the counted border number Ct. Also the width pulse counters 83 and 89 are initialized to set zero (0) as both first and second pulse numbers Cp1 and Cp2. Then the first and second photo sensors 57 and 58 are turned on.

The microcomputer 80 sends the motor drive signal to the motor driver 85 to rotate the motor 60 in reverse for the purpose of reading the used status of the photo film 12 and information of the code pattern 26. To rotate the motor 60, the spool gear 62 is caused via the speed reducing mechanism 61 to rotate in the counterclockwise direction in FIG. 6. When the spool gear 62 comes to the opening movement region, the three-toothed sector gear 67 comes in mesh with the sector gear 68a of the opener rotating member 68, to rotate the opener rotating member 68 against the bias of the toggle spring 73. Thus the opener drive shaft 56 causes the cassette shutter 21 to rotate from the closed position to the open position. The opener rotating member 68 rotates by a predetermined angle. The toggle spring 73 is shifted in an opposite direction, and biases for the sector gear 68a to rotate to the retracted position. Then the cassette shutter 21 is rotated to the open position. After this, the spool gear 62 still rotates.

When the spool gear 62 is rotated, the rotary encoder 86a generates an encode pulse by the unit rotational angle. The encode pulse is sent to the width pulse counters 83 and 89. Upon each of the encode pulses, the first and second pulse numbers Cp1 and Cp2 are respectively stepped up by one.

With rotation of the spool gear 62 and the spool drive shaft 55, the data disk 27 moves initially with Instability 1 or 2 in association with positions of the spool 13 and the spool drive shaft 55. When the spool gear 62 rotates in the opening movement region, the data disk 27 moves with Instability 3. After the spool gear 62 rotates past the opening movement region, the data disk 27 is likely to move with Instability 4. When the engaging projection 63a of the spool drive shaft 55 is reliably engaged with the key way 28a after passing the opening movement region in any manner, the rotation of the spool drive shaft 55 causes the data disk 27 to rotate stably.

During occurrence of Instabilities 1–4 or during stable rotation of the data disk 27, the first photo sensor 57 projects detecting beam toward the first opening 41, and outputs a photoelectric signal according to the intensity of the beam being reflected. The photoelectric signal is converted by the binarizing circuit 81 into the first bar code signal, which is sent to the border detector circuit 82, the first width pulse counter 83 and the microcomputer 80.

When a position confronted with the first photo sensor 57 changes from the quiet zone 35 or the black bar 37a or 37b to the white bar 38a or 38b, the first bar code signal changes from the "Low" level to the "High" level. Upon this change to the "High" level, the border detector circuit 82 sends a count-up signal to the counter 84. In response to the count-up signal, the counter 84 incrementally steps the counted border number Ct by one.

When the first bar code signal changes from the "Low" level to the "High" level, the first width pulse counter 83 resets the first pulse number Cp1 as zero (0), and then starts again counting the encode pulses.

When a position confronted with the first photo sensor 57 changes from the white bar 38a or 38b to the quiet zone 35 or the black bar 37a or 37b, the first bar code signal changes from the "High" level to the "Low" level. Then the border detector circuit 82 sends a count-up signal to the counter 84 to step the counted border number Ct incrementally by one. The first pulse number Cp1 of the first width pulse counter 83 is reset as zero (0) when the first bar code signal becomes the "Low" level, before the first width pulse counter 83 starts counting the encode pulses.

If the data disk 27 rotates reciprocally or stops in a provisional manner, the first photo sensor 57 remains confronted with the quiet zone 35 or the black and white bars 37a, 37b, 38a and 38b to keep unchanged the level of the first bar code signal. The counted border number Ct of the counter 84 is unchanged without increment. In response to each encode pulse associated with the unit rotational angle of the spool drive shaft 55, the first width pulse counter 83 incrementally steps the first pulse number Cp1 by one.

Upon the start of rotating the spool drive shaft 55, the first photo sensor 57 projects its detecting beam toward the second opening 42, receives the reflected beam, and outputs the photoelectric signal according to intensity of the reflected beam. The photoelectric signal is converted by the binarizing circuit 88 into the second bar code signal, which is sent to the second width pulse counter 89. When any of the quiet zone 35 and the black bars 37a and 37b exists at the second photo sensor 58 upon the start of the detection of the second photo sensor 58, the second bar code signal at the "Low" level is sent to the second width pulse counter 89. While the second width pulse counter 89 receives the "Low" level of the second bar code signal, the second pulse number Cp2 of the second width pulse counter 89 is stepped incrementally upon receiving each of the encode pulses. When the second width pulse counter 89 receives the "High" level of the second bar code signal, the second width pulse counter 89 is stopped from counting the encode pulses.

If any of the white bars 38a and 38b exists at the second photo sensor 58 upon the start of the operation of the second photo sensor 58, the second bar code signal initially sent to the second width pulse counter 89 is at the "High" level. The second pulse number Cp2 of the second width pulse counter 89 is kept zero (0) without counting encode pulses.

At the same time as the start of the detection of the photo sensors 57 and 58, the microcomputer 80 monitors the first pulse number Cp1 and the first bar code signal obtained from detection of the first photo sensor 57. When the first bar code signal becomes the "Low" level, then the microcomputer 80 sequentially compares the third reference number with the first pulse number Cp1 consecutively stepped up by rotation of the spool drive shaft 55 by the predetermined angle. If the first pulse number Cp1 becomes equal to the third reference number, then it is recognized that the first photo sensor 57 is confronted with the quiet zone 35. If the first bar code signal becomes the "High" level before an increase of the first pulse number Cp1 to the third reference number, then no quiet zone is recognized. The first pulse number Cp1 is reset as zero (0). Again comparison between the third reference number and the first pulse number Cp1 is effected while the first bar code signal at the "Low" level is input, so as to recognize whether the first photo sensor 57 is confronted with the quiet zone 35.

When initial existence of the quiet zone 35 is detected with the first photo sensor 57, then the microcomputer 80 monitors changes in the level of the first bar code signal and the first pulse number Cp1. The black and white bars 37a, 37b, 38a and 38b included in the bar code portion 36 are checked for their acceptable widths with the first photo sensor 57 in view of Condition 1 above. Specifically, in response to a change in the first bar code signal, the first pulse number Cp1 from the first width pulse counter 83 is equal to the value associated with the width 10° or 20°. If Condition 1 is satisfied, then it is checked whether 13 bars exist consecutively.

If the spool 13 bars have existed, then the microcomputer 80 judges whether the first photo sensor 57 is confronted with the quiet zone 35 while the first bar code signal is at the "Low" level, in a manner similar to the above. If the first photo sensor 57 is confronted with the quiet zone 35, then the microcomputer 80 has recognized a series including the quiet zone 35, the bar code portion 36 and again the quiet zone 35, namely Condition 2 is satisfied. The bar code portion 36 is regarded acceptable. At the same time, the reference detecting sequence is finished. Then the counter 84 is stopped, to stop counting the counted border number Ct.

If Condition 1 is not satisfied, or if less than 13 bars have existed, then it is judged that only a part of the bar code portion 36 is detected, and that the initial recognition of the quiet zone 35 has been wrong, and should have been read as the black bars 37a and 37b of the data disk 27 stopped incidentally. Then the microcomputer 80, upon judgment of detecting the part of the bar code portion 36, operates again for initial existence of the quiet zone 35 in a similar manner.

When the reference detecting sequence is finished, the microcomputer 80 evaluates the output of the first photo sensor 57 during one rotation or more of the data disk 27, and reads photo film sensitivity and the number of available photographable frames from the code pattern 26, before the microcomputer 80 stops the motor 60.

After the motor 60 is stopped, the microcomputer 80 reads the counted border number Ct of the counter 84. If the counted border number Ct is greater than the first reference number, then it is judged that the bar code portion 36 existed at the first photo sensor 57 at the start of operation of the first photo sensor 57. The photo film 12 in the photo film cassette 10 is recognized unexposed.

The microcomputer 80, when detecting that the photo film 12 is unexposed, causes the motor 60 to rotate forwards. The spool drive shaft 55 is caused to rotate the spool 13 in the unwinding direction. Then a leader of the photo film 12 is advanced towards the outside of the cassette shell 11 through the photo film passage port 20, and moved past the rear of an exposure aperture of the camera and toward a photo film take-up chamber (not shown). The photo film 12 is set in a standby position for taking photographs.

When all frames of the photo film 12 are exposed, the spool 13 is rotated in the rewinding direction, to contain all the photo film 12 in the cassette shell 11. After this, the microcomputer 80, while the spool drive shaft 55 rotates, monitors the first bar code signal from the binarizing circuit 81 and the first pulse number Cp1 from the first width pulse counter 83, and checks whether the quiet zone 35 moves past the first photo sensor 57. Upon passage of the quiet zone 35 by the first photo sensor 57, the microcomputer 80 resets the first pulse number Cp1 of the first width pulse counter 83 as zero (0), and causes a control of counting encode pulses in a consecutive manner irrespective of changes of the first bar code signal.

The microcomputer 80 monitors the first pulse number Cp1, and compares it with an encode pulse number which is predetermined as required for rotation of the spool 13 from a position of locating a closing end of the quiet zone 35 at the first photo sensor 57 to the exposed position Es. When the first pulse number Cp1 becomes equal to this encode pulse number, then the microcomputer 80 stops sending the motor drive signal, to stop the motor 60. The spool 13 is stopped in the exposed position Es of FIG. 7C.

It is to be noted, in the present embodiment, passage of the quiet zone 35 by the first photo sensor 57 is recognized by an operation of comparing the first pulse number Cp1 with a reference pulse number stored in association with the whole angle 170° of the quiet zone 35. Alternatively the "third reference number" having been described above may be used for comparison of the first pulse number Cp1 during an operation prior to rotating the spool 13 to the exposed position Es. Of course the "third reference number" is associated with the central angle 90°, and sufficient for recognizing existence of the quiet zone 35.

When a rewind button (not shown) is operated after partially exposing the photo film 12, all the photo film 12 is rewound into the cassette shell 11. Then operation similar to the above follows. The microcomputer 80 compares the first pulse number Cp1 with an encode pulse number which is predetermined as required for rotation of the spool 13 from the position of locating the quiet zone 35 at the first photo sensor 57 to the partially exposed position Ps of FIG. 7B. When the first pulse number Cp1 becomes equal to this encode pulse number, then the microcomputer 80 stops sending the motor drive signal, to stop the motor 60 and the spool 13. In contrast in case the rewind button is operated simply after the photo film cassette 10 of the unexposed status is loaded, all the photo film 12 is contained in the cassette shell 11, before the spool 13 is stopped in the unexposed position Us of FIG. 7A. After the stop of the spool 13 in any of those manners, the microcomputer 80 provisionally stores a stop position of the spool 13, namely the position of the spool drive shaft 55, in the RAM 80a.

After the stop of the spool 13, the lock button 54 is slid to unlock the bottom lid 53. The lock button 54 causes the drive pin 74 to swing, to rotate the linking lever 65 in the clockwise direction as viewed in FIGS. 7A–7D. The protruding end 65a pushes the linking pin 71 to rotate the opener rotating member 68, and the cassette shutter 21 rotates to the closed position. Then the bottom lid 53 is opened. The photo film cassette 10 is removed from the loading chamber 51. As soon as the spool 13 is removed from the spool drive shaft 55, the contact member 59 is moved to an unloaded position. Thus the detector switch 59a is turned off.

Referring to FIG. 14, the microcomputer 80, when the detector switch 59a is turned off, reads from the ROM 80b the number of encode pulses associated with an angle which is defined from the rotational position of the spool drive shaft 55 stored in the RAM 80a to the exposed position Es in the rewinding direction. If the spool drive shaft 55 is in the unexposed position Ud, the pulse number "Ed-Ud" is read from the ROM 80b in association with an angle between the unexposed position Ud and the exposed position Ed, and is set as a reference value Nref in a register of the microcomputer 80. Then the microcomputer 80 resets the first pulse number Cp1 of the first width pulse counter 83 as zero (0), and causes a control of counting encode pulses in a consecutive manner irrespective of changes of the first bar code signal.

The microcomputer 80 rotates the motor 60 in reverse. The spool drive shaft 55 rotates in the rewinding direction. The number of encode pulses associated with a rotating angle of the spool drive shaft 55 is counted by the first width pulse counter 83 as the first pulse number Cp1. The microcomputer 80 compares the first pulse number Cp1 with the reference value Nref. Upon the coincidence between the reference value Nref and the first pulse number Cp1, the motor 60 is stopped. The spool drive shaft 55 remains in the exposed position Ed.

If the spool drive shaft 55 is in the partially exposed position Pd, the pulse number "Ed-Pd" is read from the ROM 80b in association with an angle between the partially exposed position Pd and the exposed position Ed, and is set as reference value Nref in the register of the microcomputer 80. The microcomputer 80 compares the first pulse number Cp1 with the reference value Nref. Upon the coincidence between them, the motor 60 is stopped. The spool drive shaft 55 is stopped in the exposed position Ed.

If in contrast the spool drive shaft 55 is initially in the exposed position Ed, the spool drive shaft 55 is kept stopped irrespective of turning off of the detector switch 59a, as the microcomputer 80 presently recognizes the exposed position Ed.

Referring to FIG. 13, the flow related to the photo film cassette 10 with other status is described. If the counted border number Ct is equal to or smaller than the first reference number, the microcomputer 80 reads the second pulse number Cp2 of the second width pulse counter 89, and compares the second pulse number Cp2 with the second reference number. If the second pulse number Cp2 is equal to or greater than the second reference number, then the microcomputer 80 judges that the quiet zone 35 initially existed at the second photo sensor 58 upon the start of the detection of the second photo sensor 58, and that the photo film 12 is partially exposed in the photo film cassette 10 being inserted. In the camera, there is a magnetic reading head (not shown) disposed on a periphery of the exposure aperture. While the motor 60 is rotated forwards to advance the photo film 12 to the take-up chamber, the magnetic head reads information prerecorded in the magnetic recording layer behind the photo film 12. A first one of remaining ones of available unexposed frames is detected according to the information being read, to set the first frame on the rear of the exposure aperture. Then an operation follows in a manner similar to the unexposed status.

If the second pulse number Cp2 is smaller than the second reference value, the microcomputer 80 judges that the bar code portion 36 existed at the second photo sensor 58 upon the start of the operation of the second photo sensor 58. The photo film 12 of the photo film cassette 10 being loaded is discerned either exposed or developed. The microcomputer 80 informs the photographer that the photo film cassette 10 being unusable is loaded, and causes the spool drive shaft 55 to rotate the spool 13 in the rewinding direction, until the spool 13 is stopped in the exposed position Es. The spool drive shaft 55 is in the exposed position Ed, and is not rotated even if the detector switch 59a is turned off.

In discerning the partially exposed, exposed or developed status, the spool drive shaft 55 is preset at the exposed position Ed as standby position before receiving insertion of the photo film cassette 10. There is no error in the discernment.

When the loading chamber 51 is loaded with the photo film cassette 10 for a second time, the spool drive shaft 55 is in the exposed position Ed. Consequently the used status of the photo film cassette 10 is discerned correctly.

Figure 15:
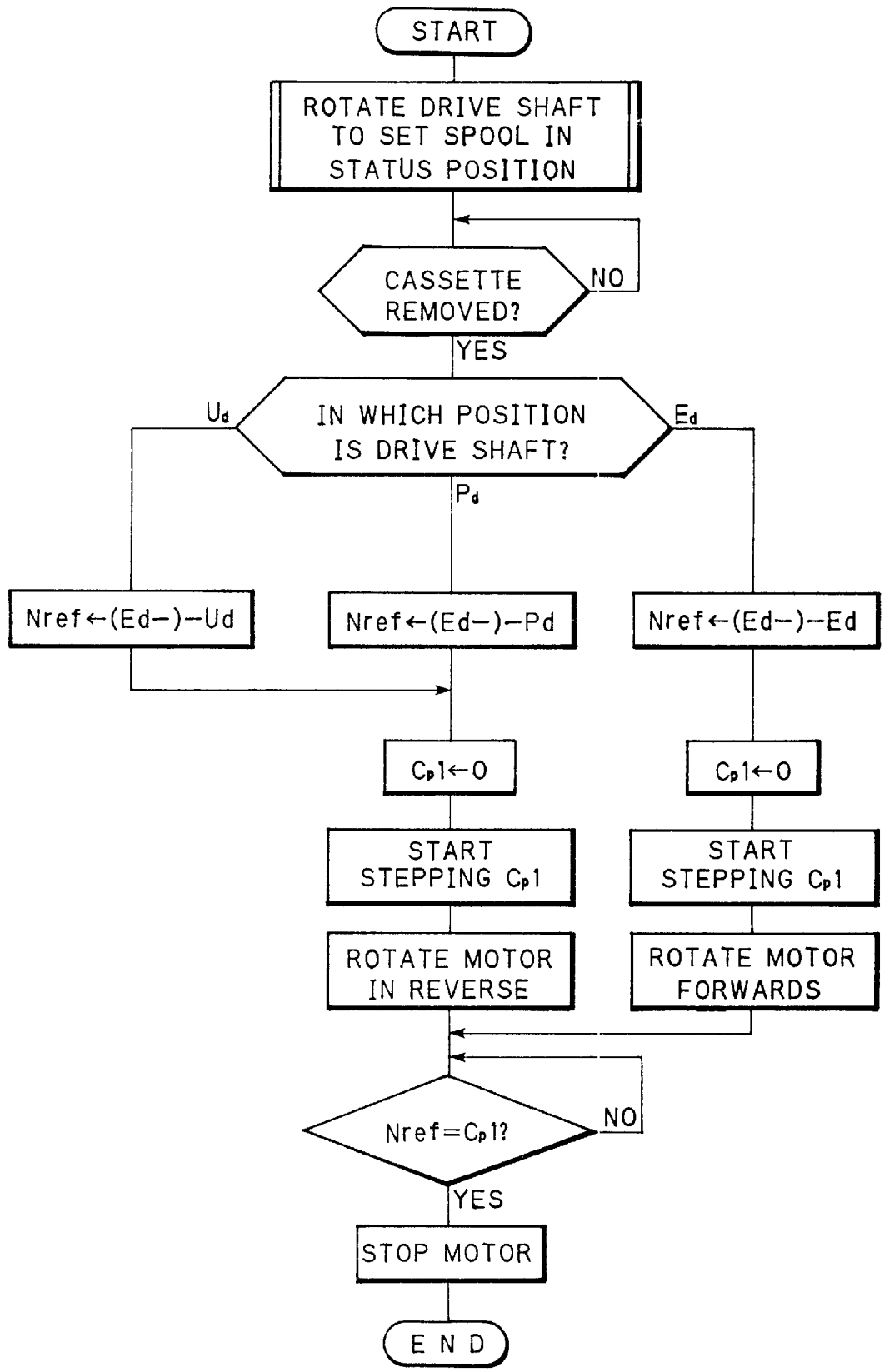
FIG. 15 is a flow chart illustrating another preferred sequence in which the spool drive shaft is stopped in a position short of the exposed position.

In FIG. 15, another preferred embodiment is illustrated, in which the spool drive shaft 55 is preset at a particular standby position different from the exposed position Ed when the photo film cassette 10 is removed from the loading chamber 51. Elements similar to those of the above embodiment are designated with identical reference numerals. In FIG. 15, "(Ed-)-Ud" is the number of encode pulses generated during rotation of the spool drive shaft 55 from the unexposed position Ud to a standby position "Ed-" which is short of the exposed position Ed. "(Ed-)-Pd" is the number of encode pulses generated during rotation of the spool drive shaft 55 from the partially exposed position Pd to the standby position "Ed-". "(Ed-)-Ed" is the number of encode pulses generated during rotation of the spool drive shaft 55 from the exposed position Ed to the standby position "Ed-".

Precisely, the standby position "Ed-" is located between the partially exposed position Pd and the exposed position Ed.

In general according to the first embodiment, it is likely that a stop position of the spool drive shaft 55 is past the exposed position where the spool drive shaft 55 should have stopped with reference to the rewinding direction. This is due to an error in the stopping operation for the spool drive shaft 55. When the photo film cassette 10 is inserted, it is likely that the spool 13 is not engaged with the spool drive shaft 55. In FIG. 9, it is indicated at a sign Es+/Ed that the spool drive shaft 55 becomes engaged with the spool 13 after making nearly one rotation, during which the data disk 27 has moved with Instabilities 1, 3 and 4. Even if existence of the quiet zone 35 is detected by monitoring the first photo sensor 57 during occurrence of the Instabilities 1 and 3, it is likely that not all the bars are detected with exactness in the width in occurrence of Instability 4. The reference detecting sequence is likely not to finish substantially during one rotation of the data disk 27. After two times of detecting the bar code portion 36 with the first photo sensor 57, the reference detecting sequence is finished upon recognizing existence of the quiet zone 35. The counted border number Ct becomes more than the first reference value. The photo film cassette 10 having the exposed status is misread as that having the unexposed status.

In FIG. 15, the detector switch 59a is turned off by removal of the cassette 10. If the photo film cassette 10 being removed has been detected with the unexposed or partially exposed status, then the microcomputer 80 causes the motor 60 to rotate in reverse. The drive shaft 55 is rotated to rotate the spool 13 in the rewinding direction. When the spool drive shaft 55 rotates up to a position between the partially exposed position Pd and the exposed position Ed, the spool drive shaft 55 is stopped in the standby position "Ed-" short of the exposed position Ed.

If the photo film cassette 10 being removed has been detected with the exposed status, then the motor 60 is rotated forwards in a direction from the exposed position Ed toward the partially exposed position Pd, to stop the spool drive shaft 55 in the standby position "Ed-" between the exposed position Ed the partially exposed position Pd. This is to prevent the spool gear 62 from rotating the opener drive shaft 56 to the open position of the cassette shutter 21.

Although the standby position "Ed-" is different from the exposed position Ed, the spool drive shaft 55, having started from the standby position "Ed-", can be moved to the exposed position Ed after small rotation, and engaged with the spool 13 in the exposed position Es. Combination Es+/Ed has no less reliability than Combination Es/Ed in view of exact discernment.

Figure 16:
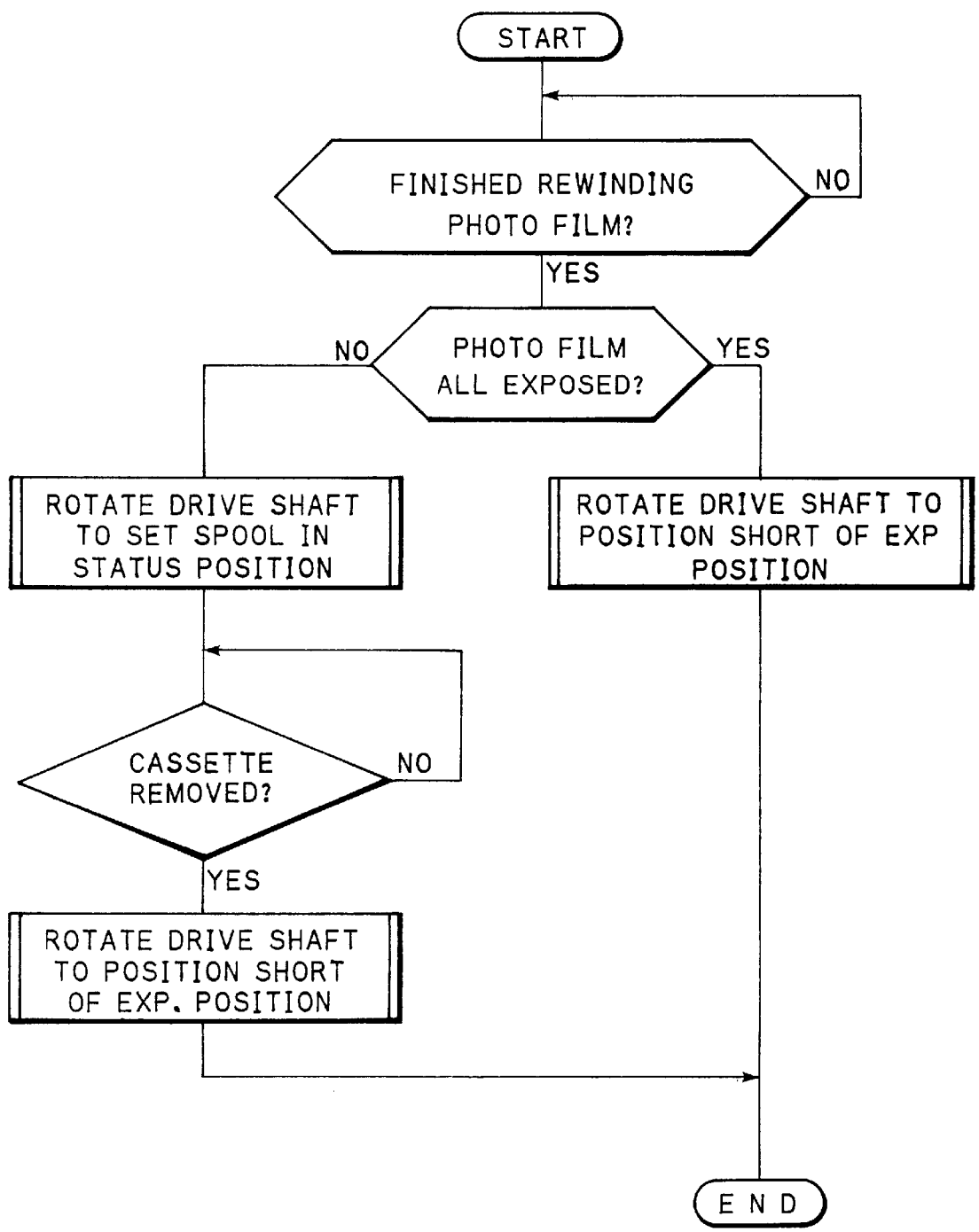
FIG. 16 is a flow chart illustrating still another preferred sequence in which the spool of the exposed status is stopped in the position short of the exposed position.

In FIG. 16, a sequence is illustrated, in which the spool 13 with the photo film 12 being exposed is stopped not in the exposed position Es but in an alternative position short of the exposed position Es. The standby position "Ed-" of the spool drive shaft 55 is used not only for the standby operation, but also by way of the exposed position Ed. As an interval between the alternative position and the exposed position Es is so small in a limited range, the indicator plate 31 still appears through the cross-shaped window 40c to indicate the exposed status.

In the above embodiments, the rotary encoder 86a is used for measuring a rotating amount of the spool drive shaft 55. The motor 60 may be any type of motor. Alternatively drive pulses may be sent to a stepping motor which may be used as the motor 60 for the spool drive shaft 55. The drive pulses may be counted to measure a rotational angle of the spool drive shaft 55. Furthermore, the number of the drive pulses may be controlled for setting positions of stopping the spool drive shaft 55.

In the above embodiment, the passage of the bar code portion 36 satisfying Conditions 1 and 2 is detected by a bar code determiner circuit, which includes a first comparator, an auxiliary counter, and a second comparator. The first comparator compares the first pulse number Cp1 with a bar width pulse number, which is predetermined according to the central angle of the black and white bars 37a, 37b, 38a and 38b. When the first pulse number Cp1 becomes equal to the bar width pulse number, acceptability of the black and white bars 37a, 37b, 38a and 38b is detected. The auxiliary counter counts a coincidence number of times when the first pulse number Cp1 becomes equal to the bar width pulse number, to count the number of the black and white bars 37a, 37b, 38a and 38b in the bar code portion 36. The second comparator compares the coincidence number with a reference coincidence number, which is predetermined according to the number of the black and white bars 37a, 37b, 38a and 38b in the bar code portion 36. When the coincidence number becomes equal to the reference coincidence number, the closing end of the bar code portion 36 is detected.

In the above embodiments, the reference detecting sequence is executed by the combined use of the first photo sensor 57, the microcomputer 80, the first width pulse counter 83, the counter 84, the rotary encoder 86a and the bar code determiner circuit. Alternatively other simplified constructions may be used for executing the reference detecting sequence, which should be a sequence for causing the spool drive shaft 55 to make certain rotations more than one rotation and less than three rotations.

In the reference detecting sequence, it is possible to eliminate the checking of Conditions 1 and 2 in the passage of the bar code portion 36, and only to detect presence of the quiet zone 35 for two times. In the simplified version of the reference detecting sequence, the spool drive shaft 55 is caused to rotate in reverse. The border number Ct of the borders starts being counted. A first presence of the quiet zone 35 at the first sensor 57 is detected by referring to the "third reference number" of encode pulses associated with rotation of the spool drive shaft 55 by 90 degrees. In the course of further rotation, the black or white bars are detected not so wide enough as associated with the "third reference number". Then a second presence of the quiet zone 35 at the first sensor 57 is detected by referring to the same "third reference number". Then the border number Ct is evaluated in comparison with the "first reference number", and if greater, then is determined to represent the unexposed status.

Note that, in the cassette shell 11, there is a partition (See FIG. 2) of black color defining a photo film chamber and an open chamber for containing the data disk 27. The quiet zone 35 is formed with the cutout. Whether each of the sensors 57 and 58 detects the cutout of the quiet zone 35 or the black arc-shaped portion adjacent to the cutout of the quiet zone 35, a signal at a common low level is output by the virtue of the black partition. Of course it is possible to dispose the sensors 57 and 58 in a direction either toward the cutout of the quiet zone 35 or toward the black arc-shaped portion adjacent to the cutout. In FIGS. 4A–4D, the cutout of the quiet zone 35 is depicted larger than it is actually.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A discerning method of discerning a used status of a photo film cassette, a photo film of said cassette being advanced to an outside of a cassette shell when a spool is rotated in an unwinding direction; said cassette including: a data disk, having a dark color, and secured to said spool in an integrally rotatable manner therewith; a rotary bar code portion, arranged on said data disk, and including black bars with low reflectance and white bars with high reflectance arranged radially in an alternate manner; a quiet zone, located with an arc-shaped cut in a periphery of said data disk, and between beginning and closing ends of said bar code; and first and second openings, formed in said cassette shell, for revealing said data disk; said discerning method comprising steps of:

setting a spool drive shaft of a camera in a reference position;

after said camera is loaded with said cassette, rotating said spool drive shaft from said reference position, upon or after a start of rotation, said spool drive shaft being engaged with said spool being in an initial position, to rotate said spool further from said initial position;

while said spool is rotating, photoelectrically detecting said bar code portion and said quiet zone with first and second photo sensors respectively through said first and second openings;

determining said initial position of said spool in accordance with signals from said first and second photo sensors, said used status being discerned with respect to said initial position of said spool.

2. A discerning method as defined in claim 1, wherein said spool is rotated in a rewinding direction reverse to said unwinding direction for detecting said initial position and discerning said used status.

3. A discerning method of discerning a used status of a photo film cassette, a photo film of said cassette being advanced to an outside of a cassette shell when a spool is rotated in an unwinding direction; said cassette including: a data disk, having a dark color, and secured to said spool in an integrally rotatable manner therewith; a rotary bar code portion, arranged on said data disk, and including black bars with low reflectance and white bars with high reflectance arranged radially in an alternate manner; a quiet zone, located with an arc-shaped cut in a periphery of said data disk, and between beginning and closing ends of said bar code portion; and first and second openings, formed in said cassette shell, for revealing said data disk; said spool being set according to said used status in an initial position selected from an unexposed position, a partially exposed position, an exposed position and a developed position which are arranged rotationally in a rewinding direction reverse to said unwinding direction, said spool being set in said unexposed position with said bar code portion located in said first opening and with said quiet zone located in said second opening, said spool being set in said partially exposed position with said quiet zone located in said first and second openings, said spool being set in said exposed position with said quiet zone located in said first opening and with said bar code portion located in said second opening; said discerning method comprising steps of:

after a camera is loaded with said cassette, rotating a spool drive shaft from a reference position, said spool drive shaft, upon or after a start of rotation thereof, being engaged with said spool being in said initial position, to rotate said spool further from said initial position in said rewinding direction;

while said spool is rotating, photoelectrically detecting said black bars, said white bars, and said quiet zone with first and second photo sensors respectively through said first and second openings;

effecting a first determination according to a signal from said first photo sensor, to determine whether said used status of said cassette is an unexposed status of said photo film; and effecting a second determination according to a signal from said second photo sensor, to determine either one of a partially exposed status and an exposed or developed status of said photo films if said used status of said cassette is determined different from said unexposed status.

4. A discerning method as defined in claim 3, wherein said first and second photo sensors output said signal at a first level while detecting said black bars and said quiet zone, and output said signal at a second level while detecting said white bars.

5. A discerning method as defined in claim 4, wherein said reference position is defined as one of an engaging position where said spool drive shaft is engaged with said spool while said initial position of said spool of said cassette is said exposed position in said loading chamber, and a position deviated from said engaging position in said unwinding direction.

6. A discerning method as defined in claim 5, wherein reverse rotation of said spool drive shaft is started when said cassette is inserted in said loading chamber, and finished after said quiet zone, said bar code portion, and again said quiet zone are detected at said first photo sensor.

7. A discerning method as defined in claim 6, wherein said first determination includes processes of:

counting a border number of said borders between said white bars and said black bars or said quiet zone in accordance with said signal from said first photo sensor;

comparing a reference border number with said counted border number, and if said counted border number is equal to or more than said reference border number, said used status being determined said unexposed status, and if said counted border number is less than said reference border number, said used status being determined said partially exposed or developed status.

8. A discerning method as defined in claim 7, wherein said second determination includes processes of:

if said signal from said second photo sensor is unchanged while said spool drive shaft rotates initially by a first reference angle, then determining said partially exposed status; and if said signal from said second photo sensor is changed while said spool drive shaft rotates initially by said first reference angle, then determining said exposed or developed status.

9. A discerning method as defined in claim 8, further comprising steps of:

generating a pulse in synchronism with rotation of said spool drive shaft by a unit rotational angle;

counting said pulse during rotation of said spool drive shaft;

when a counted number of said pulse comes up to a first reference pulse number, detecting that said spool drive shaft has rotated by said first reference angle, wherein one angle is defined by multiplying said first reference pulse number by said unit rotational angle, and is smaller than a central angle of said quiet zone and greater than a central angle of said black bars and said white bars.

10. A discerning method as defined in claim 9, further comprising steps of:

counting said pulse while a level of said signal from said first photo sensor is constant, to obtain a first pulse number; and detecting which of said black bars, said white bars and said quiet zone is confronted with said first photo sensor according to said first pulse number.

11. A discerning method as defined in claim 10, further comprising a step of, when said first pulse number comes up to a second reference pulse number, detecting that said quiet zone is confronted with said first photo sensor according to said first pulse number, wherein one angle is defined by multiplying said second reference pulse number by said unit rotational angle, and is smaller than said central angle of said quiet zone and greater than said central angle of said black bars and said white bars.

12. A discerning method as defined in claim 11, further comprising a step of, when said first pulse number is equal to a bar width pulse number, detecting that one of said black bars and said white bars is confronted with said first photo sensor according to said first pulse number, wherein said bar width pulse number is predetermined according to said central angle of said black bars and said white bars.

13. A discerning method as defined in claim 12, further comprising steps of:

counting a coincidence number of times of coincidences between said first pulse number and said bar width pulse number, to count said black bars and said white bars included in said bar code portion; and comparing said coincidence number with a reference coincidence number, said reference coincidence number being predetermined according to a number of said black bars and said white bars included in said bar code portion, and when said coincidence number is equal to said reference coincidence number, then said bar code portion being detected to have moved past said first photo sensor.

14. A discerning method as defined in claim 13, further comprising a step of using a stepping motor for driving said spool drive shaft, said stepping motor rotating by a predetermined angle upon being supplied with a drive pulse, said drive pulse comprising said pulse for detecting rotation of said spool drive shaft by said unit rotational angle.

15. A discerning method as defined in claim 13, further comprising a step of using a rotary encoder, associated with said spool drive shaft, for generating said pulse upon rotation of said spool drive shaft by said unit rotational angle.

16. A discerning method as defined in claim 13, further comprising steps of:

rewinding said photo film into said cassette by reverse rotation of said spool drive shaft after being drawn out for exposures;

after rewinding said photo film into said cassette, rotating said spool drive shaft in reverse, to set said spool in one of said unexposed, partially exposed, exposed and developed positions in accordance with a present used status of said photo film; and setting said spool drive shaft in said reference position when said cassette is unloaded from said camera.

17. A camera in which a used status of a photo film cassette is discernible, a photo film of said cassette being advanced to an outside of a cassette shell when a spool is rotated in an unwinding direction; said cassette including: a data disk, having a dark color, and secured to said spool in an integrally rotatable manner therewith; a rotary bar code portion, arranged on said data disk, and including black bars with low reflectance and white bars with high reflectance arranged radially in an alternate manner; a quiet zone, located with an arc-shaped cut in a periphery of said data disk, and between beginning and closing ends of said bar code portion; and first and second openings, formed in said cassette shell, for revealing said data disk; said spool being set according to said used status in an initial position selected from an unexposed position, a partially exposed position, an exposed position and a developed position which are arranged rotationally in a rewinding direction reverse to said unwinding direction, said spool being set in said unexposed position with said bar code portion located in said first opening and with said quiet zone located in said second opening, said spool being set in said partially exposed position with said quiet zone located in said first and second openings, said spool being set in said exposed position with said quiet zone located in said first opening and with said bar code portion located in said second opening; said camera comprising:

a cassette loading chamber loaded with said cassette;

a spool drive shaft, disposed in said loading chamber, engaged with said spool of said cassette, for rotating said spool said spool drive shaft being set at a reference position;

first and second photo sensors, disposed in said loading chamber, confronted respectively with said first and said second openings of said cassette, for photoelectrically detecting said black bars, said white bars, and said quiet zone;

first determiner means for determining whether said used status of said cassette is an unexposed status in consideration of a counted number of borders between said white bars and said black bars or said quiet zone, in accordance with a signal from said first photo sensor while said spool drive shaft is rotating from said reference position in said rewinding direction; and second determiner means for determining either one of a partially exposed status and an exposed or developed status of said photo film in accordance with a signal from said second photo sensor and the determination of said first determiner means while said spool drive shaft is rotating from said reference position in said rewinding direction, if said signal from said second photo sensor is unchanged and if said used status of said cassette is determined different from said unexposed status, said determiner means then determining said partially exposed status, and if said signal from said second photo sensor is changed and if said used status of said cassette is determined different from said unexposed status, then determining said exposed or developed status.

18. A camera as defined in claim 17, further comprising a controller for executing a predetermined reference detecting sequence in accordance with said signal from said first photo sensor, wherein said reference detecting sequence is started when said cassette is inserted in said loading chamber, causes said spool drive shaft to rotate in reverse, and finished after said quiet zone, said bar code portion, and again said quiet zone are detected at said first photo sensor.

19. A camera as defined in claim 18, wherein said controller, when entirety of said photo film is rewound into said cassette, rotates said spool drive shaft to set said spool in a selected one of said unexposed position, said partially exposed position and said exposed position, and said controller, when said cassette is removed from said loading chamber, sets said spool drive shaft in a predetermined standby position from said selected one position.

20. A camera as defined in claim 19, wherein said standby position is defined as one of an engaging position where said spool drive shaft is engaged with said spool while said initial position of said spool of said cassette is said exposed position in said loading chamber, and a position deviated from said engaging position in said unwinding direction.

21. A camera as defined in claim 20, wherein said first determiner means includes a first counter for counting said border number of said borders between said white bars and said black bars or said quiet zone in accordance with said signal from said first photo sensor, a reference border number being compared by said controller with said counted border number counted during said reference detecting sequence, and said controller, if said counted border number is equal to or more than said reference border number, determining that said used status is said unexposed status, and if said counted border number is less than said reference border number, determining that said used status is said partially exposed or developed status.

22. A camera as defined in claim 21, further comprising a rotational position detector for generating a pulse in synchronism with rotation of said spool drive shaft by a unit rotational angle;

said first determiner means includes:
      a second counter for counting said pulse from said rotational position detector while said signal from said first photo sensor is unchanged, to obtain a first pulse number, said first pulse number being evaluated for detecting one of said black bars, said white bars and said quiet zone.

23. A camera as defined in claim 22, wherein said second determiner means includes:

a third counter, started upon starting rotation of said spool drive shaft, for counting said pulse, a counted number of said third counter being detected to come up to a first reference pulse number, wherein one angle is defined by multiplying said first reference pulse number by said unit rotational angle, and is smaller than a central angle of said quiet zone and greater than a central angle of said black bars and said white bars, said partially exposed status being determined by said controller if said signal from said second photo sensor is unchanged before said counted number of said third counter comes up to said first reference pulse number, and said exposed or developed status being determined by said controller if said signal from said second photo sensor is changed before said counted number of said third counter comes up to said first reference pulse number.

* * * * *